US009166870B2

(12) United States Patent
Denis et al.

(10) Patent No.: US 9,166,870 B2
(45) Date of Patent: *Oct. 20, 2015

(54) REMOTE MONITORING SYSTEM

(75) Inventors: Arnaud Denis, Newport, RI (US); Maureen Politte, Lake St. Louis, MO (US); Randy Calabio, Town and Country, MO (US); Hoai Nguyen, Ballwin, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,352

(22) Filed: Mar. 26, 2012

(65) Prior Publication Data

US 2012/0331133 A1    Dec. 27, 2012

Related U.S. Application Data

(63) Continuation of application No. 12/044,696, filed on Mar. 7, 2008, now Pat. No. 8,145,748, which is a continuation-in-part of application No. 11/302,578, filed on Dec. 13, 2005, now Pat. No. 7,711,814.

(60) Provisional application No. 60/635,797, filed on Dec. 13, 2004, provisional application No. 60/893,772, filed on Mar. 8, 2007.

(51) Int. Cl.
*G06F 11/30* (2006.01)
*H04L 12/24* (2006.01)
*H04L 12/26* (2006.01)

(52) U.S. Cl.
CPC .............. *H04L 41/06* (2013.01); *H04L 41/147* (2013.01); *H04L 43/0817* (2013.01); *H04L 43/06* (2013.01); *H04L 43/106* (2013.01)

(58) Field of Classification Search
CPC ... H04L 41/06; H04L 41/147; H04L 43/0817; H04L 43/06; H04L 43/106
USPC ......... 709/224, 223, 229; 702/57, 60–65, 188
See application file for complete search history.

(56) References Cited

U.S. PATENT DOCUMENTS

| 4,349,879 A | 9/1982 | Peddie et al. |
| 4,521,645 A | 6/1985 | Carroll |

(Continued)

FOREIGN PATENT DOCUMENTS

| AU | 3855395 A | 6/1996 |
| AU | 5601198 A | 7/1998 |

(Continued)

OTHER PUBLICATIONS

Axis Communications, "Axis 200+ and 240 Camera Server: User's Guide", pp. 1-38, Jan. 1999.

(Continued)

*Primary Examiner* — Kenneth R Coulter
(74) *Attorney, Agent, or Firm* — Lando & Anastasi LLP

(57) ABSTRACT

A method for monitoring and reporting information regarding status of a power supply/management device operated by a user comprises detecting the status of the device using a monitoring device having an application interface configured to communicate over a communication network, generating a status update indication using a self-describing computer language and sending the status update indication over the communication network to a remote computer, and associating the user with the status update information for the remote device using the remote computer.

20 Claims, 35 Drawing Sheets

(56) References Cited

U.S. PATENT DOCUMENTS

| | | | |
|---|---|---|---|
| 4,568,934 A | 2/1986 | Allgood | |
| 4,668,939 A | 5/1987 | Kimura et al. | |
| 4,718,025 A | 1/1988 | Minor et al. | |
| 4,747,041 A | 5/1988 | Engel et al. | |
| 4,751,648 A | 6/1988 | Sears, III et al. | |
| 4,816,208 A | 3/1989 | Woods et al. | |
| 4,823,290 A | 4/1989 | Fasack et al. | |
| 4,964,065 A | 10/1990 | Hicks et al. | |
| 5,061,916 A | 10/1991 | French et al. | |
| 5,086,385 A | 2/1992 | Launey et al. | |
| 5,097,328 A | 3/1992 | Boyette | |
| 5,153,837 A | 10/1992 | Shaffer et al. | |
| 5,189,394 A | 2/1993 | Walter et al. | |
| 5,216,623 A | 6/1993 | Barrett et al. | |
| 5,220,522 A | 6/1993 | Wilson et al. | |
| 5,225,997 A | 7/1993 | Lederer et al. | |
| 5,229,850 A | 7/1993 | Toyoshima | |
| 5,289,275 A | 2/1994 | Ishii et al. | |
| 5,367,670 A | 11/1994 | Ward et al. | |
| 5,382,943 A | 1/1995 | Tanaka | |
| 5,395,042 A | 3/1995 | Riley et al. | |
| 5,400,246 A | 3/1995 | Wilson et al. | |
| 5,404,136 A | 4/1995 | Marsden | |
| 5,475,364 A | 12/1995 | Kenet | |
| 5,491,511 A | 2/1996 | Odle | |
| 5,508,941 A | 4/1996 | Leplingard et al. | |
| 5,528,507 A | 6/1996 | McNamara et al. | |
| 5,553,609 A | 9/1996 | Chen et al. | |
| 5,566,339 A | 10/1996 | Perholtz et al. | |
| 5,572,195 A | 11/1996 | Heller et al. | |
| 5,581,478 A | 12/1996 | Cruse et al. | |
| 5,621,662 A | 4/1997 | Humphries et al. | |
| 5,732,074 A | 3/1998 | Spaur et al. | |
| 5,742,762 A | 4/1998 | Scholl et al. | |
| RE35,793 E | 5/1998 | Halpern | |
| 5,798,798 A | 8/1998 | Rector et al. | |
| 5,805,458 A | 9/1998 | McNamara et al. | |
| 5,812,055 A | 9/1998 | Candy et al. | |
| 5,818,725 A | 10/1998 | McNamara et al. | |
| 5,822,302 A | 10/1998 | Scheetz et al. | |
| 5,870,698 A | 2/1999 | Riedel et al. | |
| 5,892,440 A | 4/1999 | Bryan | |
| 5,905,867 A | 5/1999 | Giorgio | |
| 5,926,210 A | 7/1999 | Hackett et al. | |
| 5,949,974 A | 9/1999 | Ewing et al. | |
| 5,955,946 A | 9/1999 | Beheshti et al. | |
| 5,963,457 A | 10/1999 | Kanoi et al. | |
| 5,963,958 A | 10/1999 | Cottrill | |
| 5,968,116 A | 10/1999 | Day, II et al. | |
| 5,974,237 A | 10/1999 | Shurmer et al. | |
| 5,978,594 A | 11/1999 | Bonnell et al. | |
| 5,987,614 A | 11/1999 | Mitchell et al. | |
| 5,991,885 A | 11/1999 | Chang et al. | |
| 5,999,179 A | 12/1999 | Kekic et al. | |
| 6,052,750 A | 4/2000 | Lea | |
| 6,055,480 A | 4/2000 | Nevo et al. | |
| 6,058,434 A | 5/2000 | Wilt et al. | |
| 6,081,606 A | 6/2000 | Hansen et al. | |
| 6,085,243 A | 7/2000 | Fletcher et al. | |
| 6,088,816 A | 7/2000 | Nouri et al. | |
| 6,094,676 A | 7/2000 | Gray et al. | |
| 6,104,868 A | 8/2000 | Peters et al. | |
| 6,105,061 A | 8/2000 | Nakai | |
| 6,108,782 A | 8/2000 | Fletcher et al. | |
| 6,112,235 A | 8/2000 | Spofford | |
| 6,122,603 A | 9/2000 | Budike, Jr. | |
| 6,122,639 A | 9/2000 | Babu et al. | |
| 6,138,078 A | 10/2000 | Canada et al. | |
| 6,138,249 A | 10/2000 | Nolet | |
| 6,139,177 A | 10/2000 | Venkatraman et al. | |
| 6,157,943 A | 12/2000 | Meyer | |
| 6,167,406 A | 12/2000 | Hoskins et al. | |
| 6,170,007 B1 | 1/2001 | Venkatraman et al. | |
| 6,175,866 B1 | 1/2001 | Holloway et al. | |
| 6,175,927 B1 | 1/2001 | Cromer et al. | |
| 6,177,884 B1 | 1/2001 | Hunt et al. | |
| 6,182,094 B1 | 1/2001 | Humpleman et al. | |
| 6,182,157 B1 | 1/2001 | Schlener et al. | |
| 6,189,109 B1 | 2/2001 | Sheikh et al. | |
| 6,195,018 B1 | 2/2001 | Ragle et al. | |
| 6,208,261 B1 | 3/2001 | Olstead | |
| 6,208,345 B1 | 3/2001 | Sheard et al. | |
| 6,215,404 B1 | 4/2001 | Morales | |
| 6,216,956 B1 | 4/2001 | Ehlers et al. | |
| 6,219,628 B1 | 4/2001 | Kodosky et al. | |
| 6,229,429 B1 | 5/2001 | Horon | |
| 6,236,332 B1 | 5/2001 | Conkright et al. | |
| 6,259,956 B1 | 7/2001 | Myers et al. | |
| 6,266,721 B1 | 7/2001 | Sheikh et al. | |
| 6,271,845 B1 | 8/2001 | Richardson | |
| 6,272,537 B1 | 8/2001 | Kekic et al. | |
| 6,281,790 B1 | 8/2001 | Kimmel et al. | |
| 6,282,546 B1 | 8/2001 | Gleichauf et al. | |
| 6,304,900 B1 | 10/2001 | Cromer et al. | |
| 6,311,105 B1 | 10/2001 | Budike, Jr. | |
| 6,324,644 B1 | 11/2001 | Rakavy et al. | |
| 6,332,202 B1 | 12/2001 | Sheikh et al. | |
| 6,343,320 B1 | 1/2002 | Fairchild et al. | |
| 6,360,255 B1 | 3/2002 | McCormack et al. | |
| 6,363,421 B2 | 3/2002 | Barker et al. | |
| 6,363,422 B1 | 3/2002 | Hunter et al. | |
| 6,373,840 B1 | 4/2002 | Chen | |
| 6,374,296 B1 | 4/2002 | Lim et al. | |
| 6,375,614 B1 | 4/2002 | Braun et al. | |
| 6,381,700 B1 | 4/2002 | Yoshida | |
| 6,389,464 B1 | 5/2002 | Krishnamurthy et al. | |
| 6,400,103 B1 | 6/2002 | Adamson | |
| 6,400,996 B1 | 6/2002 | Hoffberg et al. | |
| 6,402,691 B1 | 6/2002 | Peddicord et al. | |
| 6,404,348 B1 | 6/2002 | Wilfong | |
| 6,473,794 B1 | 10/2002 | Guheen et al. | |
| 6,477,667 B1 | 11/2002 | Levi et al. | |
| 6,496,855 B1 | 12/2002 | Hunt et al. | |
| 6,505,086 B1 | 1/2003 | Dodd, Jr. et al. | |
| 6,505,256 B1 | 1/2003 | York | |
| 6,510,350 B1 | 1/2003 | Steen, III et al. | |
| 6,529,230 B1 | 3/2003 | Chong | |
| 6,529,936 B1 | 3/2003 | Mayo et al. | |
| 6,553,336 B1 | 4/2003 | Johnson et al. | |
| 6,553,418 B1 | 4/2003 | Collins et al. | |
| 6,591,279 B1 | 7/2003 | Emens et al. | |
| 6,611,866 B1 | 8/2003 | Goldman | |
| 6,615,201 B1 | 9/2003 | Seshadri et al. | |
| 6,658,595 B1 | 12/2003 | Thamattoor | |
| 6,681,787 B2 | 1/2004 | Tinsley et al. | |
| 6,686,838 B1 | 2/2004 | Rezvani et al. | |
| 6,714,977 B1 | 3/2004 | Fowler et al. | |
| 6,756,998 B1 | 6/2004 | Bilger | |
| 6,757,714 B1 | 6/2004 | Hansen | |
| 6,801,940 B1 | 10/2004 | Moran et al. | |
| 6,829,630 B1 | 12/2004 | Pajak et al. | |
| 6,985,901 B1 | 1/2006 | Sachse et al. | |
| 6,990,513 B2 | 1/2006 | Belfiore et al. | |
| 7,051,096 B1 | 5/2006 | Krawiec et al. | |
| 7,072,987 B2 | 7/2006 | Jurisch et al. | |
| 7,117,239 B1* | 10/2006 | Hansen | 709/200 |
| 7,120,689 B2 | 10/2006 | Gonsalves et al. | |
| 7,159,022 B2 | 1/2007 | Primm et al. | |
| 7,207,041 B2 | 4/2007 | Elson et al. | |
| 7,216,093 B1 | 5/2007 | Gupta et al. | |
| 7,292,898 B2 | 11/2007 | Clark et al. | |
| 7,325,140 B2* | 1/2008 | Carley | 713/182 |
| 7,392,309 B2* | 6/2008 | Childers et al. | 709/224 |
| 7,496,652 B2 | 2/2009 | Pezzutti | |
| 7,711,814 B1* | 5/2010 | Emerick et al. | 709/224 |
| 8,145,748 B2* | 3/2012 | Denis et al. | 709/224 |
| 2001/0005894 A1 | 6/2001 | Fukui | |
| 2001/0034735 A1 | 10/2001 | Sugiyama | |
| 2001/0047213 A1 | 11/2001 | Sepe | |
| 2001/0047410 A1 | 11/2001 | Defosse | |
| 2001/0052006 A1 | 12/2001 | Barker et al. | |
| 2001/0055965 A1 | 12/2001 | Delp et al. | |
| 2002/0003575 A1 | 1/2002 | Marchese | |
| 2002/0023258 A1 | 2/2002 | Elwahab et al. | |

(56) References Cited

U.S. PATENT DOCUMENTS

| | | | |
|---|---|---|---|
| 2002/0041603 A1 | 4/2002 | Kato | |
| 2002/0043969 A1 | 4/2002 | Duncan et al. | |
| 2002/0055909 A1 | 5/2002 | Fung et al. | |
| 2002/0071031 A1 | 6/2002 | Lord et al. | |
| 2002/0072868 A1 | 6/2002 | Bartone et al. | |
| 2002/0083378 A1 | 6/2002 | Nickels | |
| 2002/0124081 A1 | 9/2002 | Primm et al. | |
| 2002/0152298 A1 | 10/2002 | Kikta et al. | |
| 2002/0161885 A1* | 10/2002 | Childers et al. | 709/224 |
| 2002/0174223 A1 | 11/2002 | Childers et al. | |
| 2002/0194492 A1 | 12/2002 | Choi et al. | |
| 2003/0098789 A1 | 5/2003 | Murakami et al. | |
| 2003/0126136 A1 | 7/2003 | Omoigui | |
| 2003/0204756 A1 | 10/2003 | Ransom et al. | |
| 2004/0160897 A1* | 8/2004 | Fowler et al. | 370/241 |
| 2004/0230566 A1* | 11/2004 | Balijepalli et al. | 707/3 |
| 2004/0249927 A1 | 12/2004 | Pezutti | |
| 2005/0071093 A1* | 3/2005 | Stefan | 702/60 |
| 2005/0086494 A1* | 4/2005 | Carley | 713/182 |
| 2007/0220104 A1* | 9/2007 | Young | 709/217 |
| 2008/0215727 A1 | 9/2008 | Denis et al. | |

FOREIGN PATENT DOCUMENTS

| | | |
|---|---|---|
| CA | 2300053 A1 | 2/1999 |
| CA | 2328939 A1 | 9/1999 |
| CA | 2312075 A1 | 12/2001 |
| CN | 87100353 A | 9/1988 |
| CN | 1294350 A | 5/2001 |
| EP | 0 591 585 B1 | 4/1994 |
| EP | 0738065 A1 | 10/1996 |
| EP | 0744112 A1 | 11/1996 |
| EP | 0859489 A2 | 8/1998 |
| EP | 0917034 A1 | 5/1999 |
| EP | 0 927 933 A2 | 7/1999 |
| EP | 0956680 A1 | 11/1999 |
| EP | 0977112 A2 | 2/2000 |
| EP | 0992100 A2 | 4/2000 |
| EP | 1002268 A1 | 5/2000 |
| EP | 1014622 A2 | 6/2000 |
| EP | 1032884 A1 | 9/2000 |
| EP | 1 049 291 A2 | 11/2000 |
| EP | 1 096 724 A1 | 5/2001 |
| EP | 1115264 A2 | 7/2001 |
| EP | 1124301 A2 | 8/2001 |
| EP | 1 150 188 A2 | 10/2001 |
| EP | 0963076 A3 | 11/2001 |
| EP | 1 178 628 A2 | 2/2002 |
| GB | 2335124 A | 9/1999 |
| GB | 2343036 A | 4/2000 |
| GB | 2344718 A | 6/2000 |
| GB | 2351205 A | 12/2000 |
| GB | 2355163 A | 4/2001 |
| GB | 2359369 A | 8/2001 |
| JP | 5040889 A | 2/1993 |
| JP | 11219388 A | 8/1999 |
| JP | 2000209204 A | 7/2000 |
| WO | 96/15615 A1 | 5/1996 |
| WO | 9915950 A1 | 4/1999 |
| WO | 9916203 A2 | 4/1999 |
| WO | 0020939 A1 | 4/2000 |
| WO | 00/35177 A1 | 6/2000 |
| WO | 00/73866 A1 | 12/2000 |
| WO | 00/79500 A1 | 12/2000 |
| WO | 01/01366 A2 | 1/2001 |
| WO | 01/08396 A1 | 2/2001 |
| WO | 0180494 A1 | 10/2001 |
| WO | 01/82028 A2 | 11/2001 |
| WO | 01/93042 A2 | 12/2001 |
| WO | 01/97907 A2 | 12/2001 |
| WO | 02/01877 A1 | 1/2002 |
| WO | 0233980 A2 | 4/2002 |
| WO | 02/37280 A2 | 5/2002 |
| WO | 2004031875 A1 | 4/2004 |
| WO | 2004044748 A2 | 5/2004 |
| WO | 2006019909 A1 | 2/2006 |

OTHER PUBLICATIONS

Axis Communications, "Axis 2400/2401 Administration Manual Version 1.1", version 1.1xx, part No. 16741, pp. 1-78, Jul. 1999.

Axis Communications, "Network Camera Developments Enable Live Web Imaging", Axis 2100 white paper, pp. 1-12, Nov. 1999.

Duran, J.W. et al., "Virtual personal computers and the portable network," IEEE Proceedings of Inter. Performance, Computing, and Communications, IPCCC'99, p. 52-56, Feb. 1999.

Kwak et al., Senddata: an agent for data processing systems using email, Aug. 6, 2002, Conference Proceeding of the IEEE International Performance, Computing, and Communications Conference, pp. 264-270).

Search Report from corresponding GB Patent Application No. GB0804278.0 dated Jun. 30, 2008.

Simon M. Lucas, Web-based evaluation and deployment of pattern recognizers, 2002, Proceedings of 16th International Conference onPattern Recognition, vol. 3, pp. 419-422 vol. 3).

Sinetica Corp., "Netcom TH. Advanced SNMP Agent with Web Browser Support", Sinetica, UK, Apr. 2000, XP002160505, 2 pp.

Sinetica Corp., "Newsletter, Issue One 99", Sinetica, UK, Feb. 1999, XP002160504, 4 pp.

* cited by examiner

| Company | Identifier | Description | TicketId | TicketState | Count | Dat |
|---|---|---|---|---|---|---|
| Customer 1 | WA0429150022 | Environmental Violation | WA042915... | Open | | 12/ |
| Customer 2 | ZA0441003734 | Environmental A violation | ZA0441003... | Open | 9 | 12/ |
| Acme Corpration | ZA0511000237 | Environmental A violation | ZA0511000... | Open | | 12/ |
| APC Testing | ZA0441003734 | Environmental A violation | ZA0441003... | Closed | 9 | 12/ |
| Another Customer | ZA0441003734 | Environmental A violation | ZA0441003... | Closed | 4 | 12/ |
| APC | GF0317162752 | No update has been rec... | GF031716... | Closed | 118 | 12/ |
| Testing 1 | SE9947GL0006 | No update has been rec... | SE9947GL... | Closed | 118 | 12/ |
| Customer 9 | ZA0518004488 | Environmental Violation | ZA051800... | Closed | | 12/ |
| joe bloggs | SE010000091 | No update has been rec... | SE010000... | Closed | 118 | 12/ |
| Company 3 | XF0327001135 | No update has been rec... | XF032700... | Closed | 118 | 12/ |
| Corpo 4 | XF0240013385 | No update has been rec... | XF024001... | Closed | 11 | 12/ |
| RMS | IA0347110270 | No update has been rec... | IA034711... | Closed | 118 | 12/ |
| Customer 7 | ZA0511000237 | Environmental A violation | ZA051100... | Closed | | 12/ |
| Big Customer | ZA0451005584 | Environmental A violation | ZA045100... | Closed | 1705 | 12/ |
| Jane Doe | XF0320002793 | No update has been rec... | XF032000... | Closed | 118 | 12/ |
| Corpo 1 | ED042001923 | UPS: One or more faulty... | ED042001... | Closed | 2 | 12/ |
| Testing 4 | SE99456L0004 | No update has been rec... | SE99456l... | Closed | 118 | 12/ |
| Customer 765 | WA0503110114 | No update has been rec... | WA050311... | Closed | 118 | 12/ |
| Customer 3 | ZA0451006434 | Environmental A violation | ZA045006... | Closed | 908 | 12/ |
| Customer | XF0324002092 | No update has been rec... | XF032400... | Closed | 118 | 12/ |
| Small Customer | ZA0510009158 | Environmental A violation | ZA051000... | Closed | 4 | 12/ |
| APC 90 | WA0534210556 | No update has been rec... | WA053421... | Closed | 118 | 12/ |
| APC | WA0441110181 | No update has been rec... | WA044111... | Closed | 118 | 12/ |
| Company 7 | WA0526110372 | No update has been rec... | WA052611... | Closed | 118 | 12/ |

Recommendations

The Details section of this report contains data substantiating the following recommendations.

Environmental Monitoring Units

- Humidity above 60%. High humidity can be damaging for metallic parts as well as being a hazard risk for live electrical components. If the humidity is high, it is important to verify the proper operation of any de-humidifier. In case there is no device to reduce the humidity, it is strongly recommended to address this as quickly as possible.

While these issues are not immediately impacting the device, it is recommended that they be investigated.

FIG. 4 (continued)

Details /—138

/—140

| UPS | Load (%) | | | Balanced | Runtime (min) |
|---|---|---|---|---|---|
| | Phase 1 | Phase 2 | Phase 3 | | |
| ED0318003562 Symmetra 80K.ISX (my Sym) | 55.0 | 60.0 | 50.0 | YES | 880.0 |
| YS0303210738 Smart-UPS RT 5000 XL.ISX | | | | NA | 9999.0 |
| WA9925002140 Silicon DP310E.ISX | 0.0 | 0.0 | 0.0 | YES | 256.0 |
| ED0440002046 Symmetra LX 16000.ISX | 60.0 | 50.0 | | YES | 202.0 |

/—142

| UPS | Power (Watts) | | | | Balanced | Power Factor | | | |
|---|---|---|---|---|---|---|---|---|---|
| | Phase 1 | Phase 2 | Phase 3 | Total | | Phase 1 | Phase 2 | Phase 3 | Total |
| JL1015200422345 678 | 1.4 | 1.4 | 1.4 | 4.2 | YES | 1.0 | 1.0 | 1.0 | 3.0 |

1 devices need attention
Only PDU devices that support power values are shown.

/—144

| Environment | Probe 1 | | Probe 2 | |
|---|---|---|---|---|
| | Temperature | Humidity | Temperature | Humidity |
| WA0412160047 Environmental Management System.ISX | | | | |

Temperatures expressed in Degrees Fahrenheit

FIG. 4 (continued)

| RMSG3DEVSTL Remote Monitoring Service Company | | |
|---|---|---|
| Power Distribution Units | ⚠ | 1 device needs attention. |
| Environmental Units | ✓ | No devices need attention. |
| Network Cooling Systems | ✓ | No devices need attention. |
| Uninterruptible Power Supplies | ❗ | 1 device needs immediate attention. |
| Other Devices | ✓ | Serial      Name    Location |
| | | ED0515001637    N/A    N/A |
| Profile Validation | ⚠ | |
| Contract Status | ⚠ | |

FIG. 6A

System Configuration  Devices  Reports  Help

| Identifier | Model | Company | Facility | Date Updated |
|---|---|---|---|---|
| ☐ ED0515001637 | Symmetra 40K.ISX | RMSG3DEVSIL Remote Monitoring Service Company | Saint Louis RMS Facility HQ | 02/12/2007 01:08 |

Device Event Log
Show Codes
10 items found

| Description | Severity | Date Created | Count - Date Updated | Date Cleared |
|---|---|---|---|---|
| UPS: Cannot switch to bypass: the input voltage or frequency is not within its defined limits | Critical | 2007-02-12 01:08:38 PM PET | 1 - 2007-02-12 01:08:38 PM PET | |
| UPS: Cannot switch to bypass: the input voltage or frequency is not within its defined limits | Critical | 2007-01-31 05:06:41 PM PET | 29-2007-01-31 05:09:18 PM PET | 2007-02-07 12:58:36 PM PET |

| Welcome | Company | Facilities | Contacts | Users | Devices | Preferences | Validation |

Users

| User Login | Contact Name | Role |
|---|---|---|
| rcalabio@apc.com | Randy Calabio | NOCSuperAdmin |
| carol.scott@apc.com | Carol Scott | NOCSuperAdmin |
| liz.schultz@apc.com | Liz Schultz | NOCSuperAdmin |
| Liz.Schultz@apc.com | Liz Schultz | Administrator |
| khudson@apc.com | Kate Hudson | NOCAdmin |
| randy.calabio@apc.com | Randy Calabio | NOCSuperAdmin |

Contact Name:* [Randy Calabio]
User Login:* [Rcalabio@apc.com]
Password:* [•••]
Confirm Password:* [•••]
Hint: [apc apc apc fdfdfd]
Degree Preference: [Fahrenheit]
Role:* [Read Only]
Active: [☑]

[Create] — 1106
[Delete] — 1108
[Cancel] — 1110

1112 User List
1104 User Entry Subsection
1102 User Section

Why?

User List and Details

The User list contains names from the Contact list. The User list will be empty if you have not filled in the Contact list.

A User has access to the Remote Monitoring website and can receive emailed reports. A Read Only user can run reports and view the contact list, but cannot access the Profile Wizard. An Administrator user has read/write privledges and can modify the contact list A Contact is someone who is notified when an event occurs or who receives the device summary (Health Summary) report. A Contact does not need to be a User, unless you want the Contact to receive a Health Summary report. A Contact must be defined as a User to receive a report.

Note: The User list can be sorted by User Name, Login, and User role.

[<< Previous]
[Next >>]

Admin | Home | Help | Logout

1100 Users Screen

1600 Business Rule Results Screen
1602 Business Rule Result Section
1604 Executable Business Rule List
1606 Export Data

FIG. 17

| State | Escalation | Company | TicketId | Description | Count | Identifier | Date Updated | Date Cleared | Date Created |
|---|---|---|---|---|---|---|---|---|---|
| New | Technical Support | RMSG33DEVSTL Remote... | RAC44444... | UPS: Output power has been turned... | 2 | RAC44444444 | 3/1/07 4:07... | | 2/28/07 12:... |
| New | Technical Support | RMSG33DEVSTL Remote... | ED061500... | UPS: Cannot switch to bypass; the in... | | ED0515001637 | 3/1/07 4:07... | | 3/1/07 4:07... |
| New | Technical Support | RMSG33DEVSTL Remote... | XS021400... | UPS: The agent lost communication... | | XS021400563B | 3/1/07 4:07... | | 3/1/07 4:07... |
| New | No Action | Network Computing Mag... | WA052211... | No update has been received from th... | 4 | WA0522110064 | 3/1/07 4:08... | | 3/1/07 3:50... |
| | No Action | Kimley Horn & Associates | | No update has been received from th... | 4 | WA0446110103 | 3/1/07 4:07... | | 3/1/07 3:50... |
| | No Action | American Power Conver... | | No update has been received from th... | 4 | WA0440110191 | 3/1/07 4:08... | | 3/1/07 3:50... |
| | No Action | PPD | | No update has been received from th... | | WA0511320068 | 3/1/07 4:07... | | 3/1/07 4:07... |
| | No Action | Video Monitoring Services | | InRow RC: {0}: Fire detected | | IS0406110023 | 3/1/07 4:07... | | 3/1/07 4:07... |
| | No Action | RMSG33DEVSTL Remote... | | | | 3302006222 | 3/1/07 4:07... | | 3/1/07 4:07... |
| | No Action | East Boston Neighborho... | | No update has been received from th... | | IA0408110027 | 3/1/07 4:08... | | 3/1/07 4:08... |

1800 — Event Viewer
1802

REMOTE MONITORING SYSTEM

RELATED APPLICATIONS

This application is a continuation of U.S. application Ser. No. 12/044,696, entitled "REMOTE MONITORING SYSTEM," filed on Mar. 7, 2008, now U.S. Pat. No. 8,145,748 which claims priority under 35 U.S.C. §119(e) to U.S. Provisional Application Ser. No. 60/893,772, entitled "REMOTE MONITORING SYSTEM," filed on Mar. 8, 2007 and is a continuation in part of U.S. application Ser. No. 11/302,578, entitled "METHOD AND SYSTEM FOR REMOTE MONITORING OF A POWER SUPPLY DEVICE WITH USER REGISTRATION CAPABILITY," filed on Dec. 13, 2005, which claims priority under 35 U.S.C. §119(e) to U.S. Provisional Application Ser. No. 60/635,797, entitled "REMOTE MONITORING SYSTEM," filed on Dec. 13, 2004. Each of these applications is herein incorporated by reference in its entirety.

BACKGROUND OF INVENTION

Today, companies and persons rely on having consistent supply of power to electronic devices more than ever. Without power, companies may be unable to manufacture goods, or to operate at all, such as if the company is in the business of supplying information over the Internet. Without power, businesses and individuals may be completely incapacitated regarding critical activities, such as making goods, providing services, and transacting personal finances (e.g., filing tax returns, and paying bills).

Frequently, individuals and companies monitor the supply of power to electronic devices or facilities to ensure that their affairs and/or businesses are not significantly affected by a power outage, a change in status or some other power alteration. Uninterruptible power supplies (UPSs) are often used to provide backup power in case of a power outage. UPSs are commonly used on computing equipment to guard against data being lost due to a power outage before the data are saved. UPSs used with computing equipment also help to guard against a loss in service by providers of information over the Internet, such as by servers, e.g., hosting web pages.

Device status is often monitored and reported to the individual or company owning a device using email notification or the Plain Old Telephone System (POTS), which requires the installation of a remote monitoring unit at the customer site and is physically dialed into to get updates and specifics. Frequently, companies are obligated to provide manpower at substantial cost so that electronic devices can be monitored and reported on a regular basis.

SUMMARY OF INVENTION

In general, in an aspect, the invention provides a method for monitoring and reporting information regarding status of a power supply/management device operated by a user. The method includes detecting the status of the device using a monitoring device having an application interface configured to communicate over a communication network, generating a status update indication using a self-describing computer language and sending the status update indication over the communication network to a remote computer, and associating the user with the status update information for the remote device using the remote computer.

Implementations of the invention may include one or more of the following features. The method can include sending the user registration information to the remote computer which may comprise sending the user registration information via email. Sending the user registration information to the remote computer can comprise sending the user registration information via HTTP post. Sending the status update indication to the remote computer can comprise sending the status update indication via HTTP post. The method can include generating a user registration using a self-describing computer language and sending the user registration to the remote computer. The method may also include associating the user with the status update information for the remote device using mapping of the user and the device. Sending the user registration information to the remote computer can comprise sending the user registration information via a web service, the web service communicating the user registration to the remote computer. The self describing computer language can include eXtensible Markup Language (XML).

In general, in another aspect, the invention provides a system for communicating via a communication network with remote devices connected to at least one management device to monitor and supply a status associated with the remote devices. The system includes a first communication interface connected to the at least one management device configured to transfer status data associated with the remote devices over the communication network, a second communication interface configured to transfer data related to a user registration for a user having at least one remote device in communication with the communication network, a processor configured to receive the status data and the user registration data over the communication network and associate the user registration data with the status data associated with the remote devices, and a manager coupled to the processor and configured to receive and report the status data to the user Implementations of the invention may include one or more of the following features. The second communication interface can include a remote monitoring service web site on which the user enters user registration data. The manager can produce an event ticket when the status data associated with the remote device indicates a change in status. The processor can be further configured to inspect and manage user contracts/agreements associated with the user, and associate the status data and the user registration data based on information in the user contract. The manager can create an executive report and communicates the executive report to the user over a third communication network. Device data retrieved can be utilized for data mining, predictive failure analysis, sales support, quality improvement and technical service support.

Characteristics of the invention may include one or more of the following capabilities. A monitoring center can provide a human interface for analyzing and reporting data related to devices at remote locations. Customers can be directly contacted via phone, email or other means upon severe event occurrence. Service start-up of devices is monitored by the remote monitoring center. Device registration can be performed automatically in response to device purchase. Outsourcing for management of tickets, contracts/agreements or bulletin board notices may be alleviated. Data may be analyzed to determine maintenance needs. Implementation of additional remote monitoring devices at the site of electronic devices is avoided. Troubleshooting can be accomplished via a service center and can occur at the time of event occurrence. Devices can be controlled via the remote monitoring service to alter operations when events occur. Manpower for monitoring internal systems at the customer site and cost related thereto can be reduced.

These and other capabilities of the invention, along with the invention itself, will be more fully understood after a review of the following figures, detailed description, and claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A-3C are exemplary screen displays of event management information associated with monitored locations.

FIG. 6a is another example user interface according to one embodiment of the present invention that may be presented as part of a company home page to a user by a remote device monitoring system.

FIG. 6b is another example user interface according to one embodiment of the present invention that may be presented as part of a company home page to a user by a remote device monitoring system.

FIG. 8 is another example user interface according to one embodiment of the present invention that may be presented to a user by a remote device monitoring system to enter company information.

FIG. 9 is another example user interface according to one embodiment of the present invention that may be presented to a user by a remote device monitoring system to enter facility information.

FIG. 10 is another example user interface according to one embodiment of the present invention that may be presented to a user by a remote device monitoring system to enter contact information.

FIG. 11 is another example user interface according to one embodiment of the present invention that may be presented to a user by a remote device monitoring system to enter user information.

FIG. 12 is another example user interface according to one embodiment of the present invention that may be presented to a user by a remote device monitoring system to associate contacts with devices.

FIG. 16 is another example user interface according to one embodiment of the present invention that may be presented to a user by a remote device monitoring system to execute a business rule.

FIG. 17 is another example user interface according to one embodiment of the present invention that may be presented to a user by a remote device monitoring system to develop a business rule.

FIG. 18 is another example user interface according to one embodiment of the present invention that may be presented to a user by a remote device monitoring system to display monitored device status information.

FIG. 22 is another example user interface according to one embodiment of the present invention that may be presented to a user by a remote device monitoring system to display delayed acknowledgement information.

DETAILED DESCRIPTION

Figure 1:
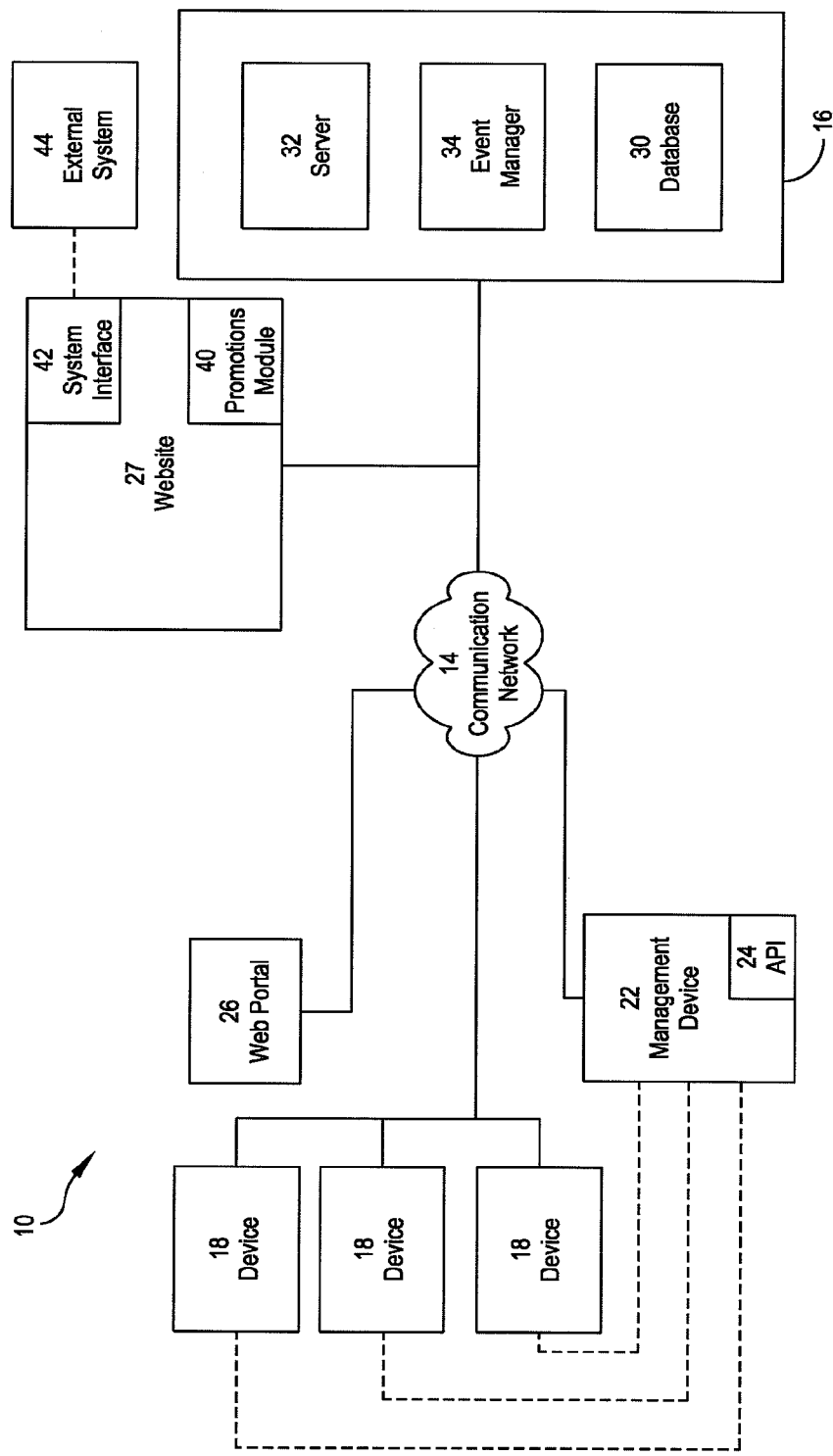
FIG. 1 is a diagram of a system for monitoring power status information for a remote location.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Various embodiments of the present invention provide techniques for monitoring devices from a remote location. Also, various aspects of the present invention relate to reporting the status of devices and controlling devices from the remote location. According to one embodiment, devices can be monitored at distributed locations, reported to a centralized monitoring system and controlled by the centralized system.

Remote management can be accomplished using a web portal, an application interface and a remote monitoring event manager. The application interface is associated with electronic devices. As discussed below in one embodiment, the application interface enables the electronic devices to communicate with other computing devices through a computer network. Data collected from the application interface can be transported to the event manager as an email. Data collected from the application interface and the web portal can be displayed as Hyper Text Transfer Protocol (HTTP) post data at the remote monitoring center. Customer information can be sent from the monitored device at startup, and can be XML formatted. Device data can also be XML formatted. The system includes a built in trouble ticketing system and a notification system. The notification system may include rules that define which contact personnel should be notified when a particular electronic device encounters an anomaly. These rules, termed escalation rules, may also include the order in which personnel should be contacted as well as the preferred mode of communication for each contact. A customer having a device can utilize a remote monitoring system web site to enter contact information, create and view reports and define event escalation rules that are related to the monitored devices. The application interface acts as a proxy between the device and the event manager at the remote monitoring center. The event manager monitors incoming device alarms at a location remote from the devices. Devices monitored can include, for example, uninterruptible power supplies (UPS's), cooling devices, environmental probes, and power distribution devices. Devices can include power management software or a management device to monitor performance of the devices. Devices containing the power management software can be distributed throughout the country, and even globally. Reports on the status of devices can be generated and information provided to users in various ways such as over the Internet. Other embodiments are within the scope of the invention.

Referring to FIG. 1, a system 10 includes a customer site 12, a communications network 14 and a remote monitoring center 16. The customer site 12 includes monitored devices 18, a management device (MD) 22, a remote monitoring system application layer interface (API) 24 and a web portal 26. Each device 18 can have its own MD 22. The remote monitoring center 16 includes a database 30, a server 32 and an event manager/viewer 34. The server 32 and the remote devices 18 are configured with communication interfaces and coupled for uni-directional communication with the network 14. For example, the API 24 is embedded in the MD 22 to allow communication between the devices 18 and the network 14. In an alternate embodiment, remote devices 18 may communicate bi-directionally with network 14 independently of MD 22. The API 24 can be embedded within a management device, an ISX Manager®, and/or Power-Chute® Business Edition (PCBE), or other hardware and software applications, for example. In at least some embodiments, the MD 22 is coupled directly to the communications network 14. In one embodiment, MD 22 may include a support call button that when actuated may establish an interactive communication session, such as a phone call or chat session, with staff located at remote monitoring center 16. Customer identification information, e.g. telephone number, may be included when establishing the session and the medium of communication may be network 14. In other embodiments, the support call button may be located on devices 18 or elsewhere, and the interactive communication session may use a medium other than network 14, such a standard telephone line. The server 32 can be, e.g., a single computer server or a bank of servers, and information flowing into and out of the bank of servers may be load balanced. The communication network 14 can be any of a variety of communication networks currently known (e.g., the Internet, a local area network (LAN), a wide area network (WAN), an integrated services digital network (ISDN), a wireless network, a POTS based network, etc.) or developed in the future. Although only one server 32 and three remote devices 18 are shown, other numbers of servers 32 and/or remote devices 18 may be used. For example, the monitoring center 16 may include a web server and a mail server separately. The monitored devices 18 can be any of several types of devices including any device that may be capable of communicating with a computing device such as general purpose computing system 400 discussed with regard to FIG. 24 below, e.g., uninterruptible power supplies, battery management systems or other electronic devices or groups of electronic devices, etc. The monitored devices 18 may be disposed remotely from each other such as in different zip codes, cities, counties, states, or countries.

The devices 18 communicate with the MD 22, which accepts data related to the status of the devices 18. Remote monitoring units other than the MD 22 can directly interact and communicate with the server 32 over the network 14. The MD 22 includes a processor for performing instructions in software in the API 24. The software in the MD 22 is also configured for general interaction with the devices 18. The MD 22 is configured to detect power status, temperature, humidity, load and other status information at the devices 18. In one embodiment, MD 22 may receive commands for one or more devices 18 from RMS website 27 through network 14 as discussed below. MD 22 may then communicate these commands to devices 18 for further processing. In an alternate embodiment, devices 18 may receive commands directly from RMS website 27 through network 14. Devices 18 may expose to the customer an interface to configure which commands may or may not be executed from RMS website 27 through network 14. The API 24 is embedded in the MD 22 and is configured as a software program to provide an interface between the devices and the server 32 at the remote monitoring center 16. The API 24 processes the information collected and sends the information via the communication network 14 to the server 32. The API 24 is configured to receive information regarding status from the server 32 via the network 14. Other configurations of the API 24 are possible such as pure hardware configurations, or combinations of hardware and software, etc.

The MD 22 can detect that a device 18 switches and/or has switched to battery operation, detect increases/decreases in temperature, and detect other activity indicating an event, such as an outage or a reduction or increase in power exceeding a threshold. In one embodiment, devices 18 may communicate status information, or events, which include an escalation instruction. These events may result in special highlighting of the status information in event manager as discussed with regard to FIG. 18 below. In response to an event, the MD 22 produces and sends an indication of the event (e.g., power failing to meet requirements) that gets transmitted through the network 14 to the server 32. The event indication provides the server 32 with a variety of information regarding the event. For example, the information can include a time of the event. The MD 22 is configured to determine and report resolution of an event. The MD 22 is further configured to detect status information other than power considerations, such as load considerations, temperature, and humidity.

Information provided to the server 32 through the API 24 in the MD 22 is preferably provided using a low-level protocol and is done in a manner to reduce the likelihood of simultaneous high-reporting traffic. For example, the information is provided using an HTTP POST command, via email, via web services or via other techniques. The information is reported asynchronously from the API 24. Techniques can be used to help prevent reporting congestion including aggregating multiple power events into a single report and reporting them in one transaction.

The API 24 is configured to provide heartbeat signals to the server 32. The heartbeat signals provide periodic (or possibly aperiodic) indicia that the devices 18 are operational and that the equipment between the API 24 and the server 32 is operational and connected. The server 32 is configured to expect the heartbeat signals from the reporting units and to respond if one or more of the heartbeat signals are not received, e.g., within an expected time frame. For example, if no heartbeats are received in a threshold amount of time, the server 32 may determine that a failure has occurred in the reporting units, the devices 18, the network 14, and/or one or more connections of these devices/systems to the server 32. The server 32 may respond by indicating a failure. If multiple heartbeats from multiple reporting units are not received within the same time frame, the server 32 may surmise that the network 14 has failed or that another, relatively global (as opposed to isolated to a particular reporting unit) failure has occurred, such as a large-scale power outage.

The web portal 26 is configured to communicate over the network 14. Information entered at the web portal 26 is communicated to the event manager 34 via the network 14. The web portal 26 allows a customer to enter and modify profile data (e.g., customer registration info), view contracts/agreements, define event escalation rules related to the operation of a device 18, view an alarm/event log and view device specifics (product and model type) and data points. The customer registration information describing and/or identifying the customer and entered at the web portal 26 is sent to the database 30 for storage at the monitoring center 16. The server 32 processes the customer data with incoming data from the API 24. Customer data is associated with the device data at the monitoring center 16. Customer data is preferably sent once and mapped to the device 18 serial numbers, e.g., by cross referencing purchases made by the customer. The customer information is sent in XML format. The API 24 also sends device data in XML format, in configurable time periods, e.g., heartbeat data every 10 minutes and status data every 8-24 hours, although other formats are possible. For example, the customer registration information can be transmitted via a web service operated by the remote monitoring center 16. The customer can log on and enter registration information on a Remote Monitoring System (RMS) web page, e.g., hosted by a server associated with the RMS 16, and transmit the entered data via a web service to the server 32. The server 32 is configured to host the web page for information entry.

Through the web portal 26, on-line help is available. In one embodiment, access permissions/user roles, which are classifications of users that may enable access to specific sets of system functionality, at the web portal 26 include Network Operations Center (NOC) super administrators, NOC administrators, NOC user, company administrators (e.g., for editing customer data and creating company users), and company user, which can be designated as read-only. In another embodiment, access permissions/user roles may include NOC super administrator, NOC Administrator, Administrator, and Read Only. Other access permissions can be enabled. The web portal 26 defines alarm/event escalation based on activity from the devices 18. Real time data graphs are generated based on the activity monitored and recorded at the monitoring center 16.

The customer registration information entered at the web portal 26 is transmitted via a website operated by the remote monitoring center 16. Alternatively, the website 27 can be operated by a party other than the remote monitoring service 16 provider. The customer logs on and enters registration information on a Remote Monitoring Service web page, and transmits the data via the communication network 14 to the server 32.

The server 32 is configured to receive and process (e.g., in a server processor) incoming power anomaly/event indicia from the API 24 and to provide server output signals that include power status information such as accumulated/aggregated and collated power anomaly information. The server 32 collects data from multiple individuals/companies/devices/organizations/locations. Information processed by the server 32 is stored in the database 30. The server 32 is configured to determine start times and end times of power anomalies and associated locations of the power anomalies. For example, the server determines start and end times by processing received indicia of beginnings and ends of power events, with associated information as to locations of the reporting units and/or the corresponding devices 18. The server 32 is configured to determine timing of events, as events are time stamped (or by cross-referencing a clock, etc.).

The server 32 accumulates the event information and other device information received to determine status reports on a per customer basis and provides reports to the event manager 34 and/or the customer. The reports indicate events occurring at one or a number of locations, and identify the device 18 affiliated with an event. The server 32 processes the information, whether the information is in email format, HTTP format or other known data formats. The data is parsed and stored on the database 30.

The event manager 34 is configured to receive and process output signals from the server 32 to provide desired information to users of the remote devices 18. For example, the server 32 receives data and associated customer information and the data are displayed by the event manager 34. The event manager 34 also evaluates the server output signals to determine whether action at the customer site 12 is warranted/desirable. The event manager 34 monitors incoming device alarms that are sent from the API 24. The API 24 acts as a proxy between the device 18 and the event manager 34, and substantially all data are sent through the API 24. The server 32 receives customer data via HTTP and device alarms via HTTP, both in XML format. The event manager 34 provides a hypertext link to the remote monitoring system web site 27.

The event manager 34 provides a built-in trouble ticketing system associated with the incoming alarms. Trouble ticket viewing is restricted to designated individuals at the customer site 12. Trouble ticket viewing can be provided, for example, at two permission levels: NOC personnel and Remote Monitoring System customers. The web portal 26 includes a built-in bulletin board for internal NOC notification. From the event manager 34, the monitoring operation center has a hyperlink to the remote monitoring website 27. Device information is retrieved from the remote service website 27. In one embodiment, remote service website 27 may be implemented using a general-purpose computer as discussed below with reference to FIG. 24.

In another embodiment, RMS website 27 may expose system interface 42 to share device and other information with external system 44. The monitored device information that may be shared in this manner includes device model, serial number, firmware version and geographic location. Other shared information may include escalated support events that require firmware upgrades or hardware replacement. In one embodiment, the external system which receives this information may be, for example, Siebel Customer Relationship Management (CRM) applications available from Oracle Corporation of Redwood Shores, Calif. When so coupled, information regarding newly installed devices, changes in previously installed device, and escalated support events may automatically flow from the devices in the field into the Siebel CRM application, thus ensuring the CRM application has current data. Although various embodiments of the present invention may be implemented in the Siebel CRM application, it should be appreciated that various aspects of the present invention may be implemented with other CRM or other types of external systems, and the invention is not limited to any specific external system.

Figure 23:
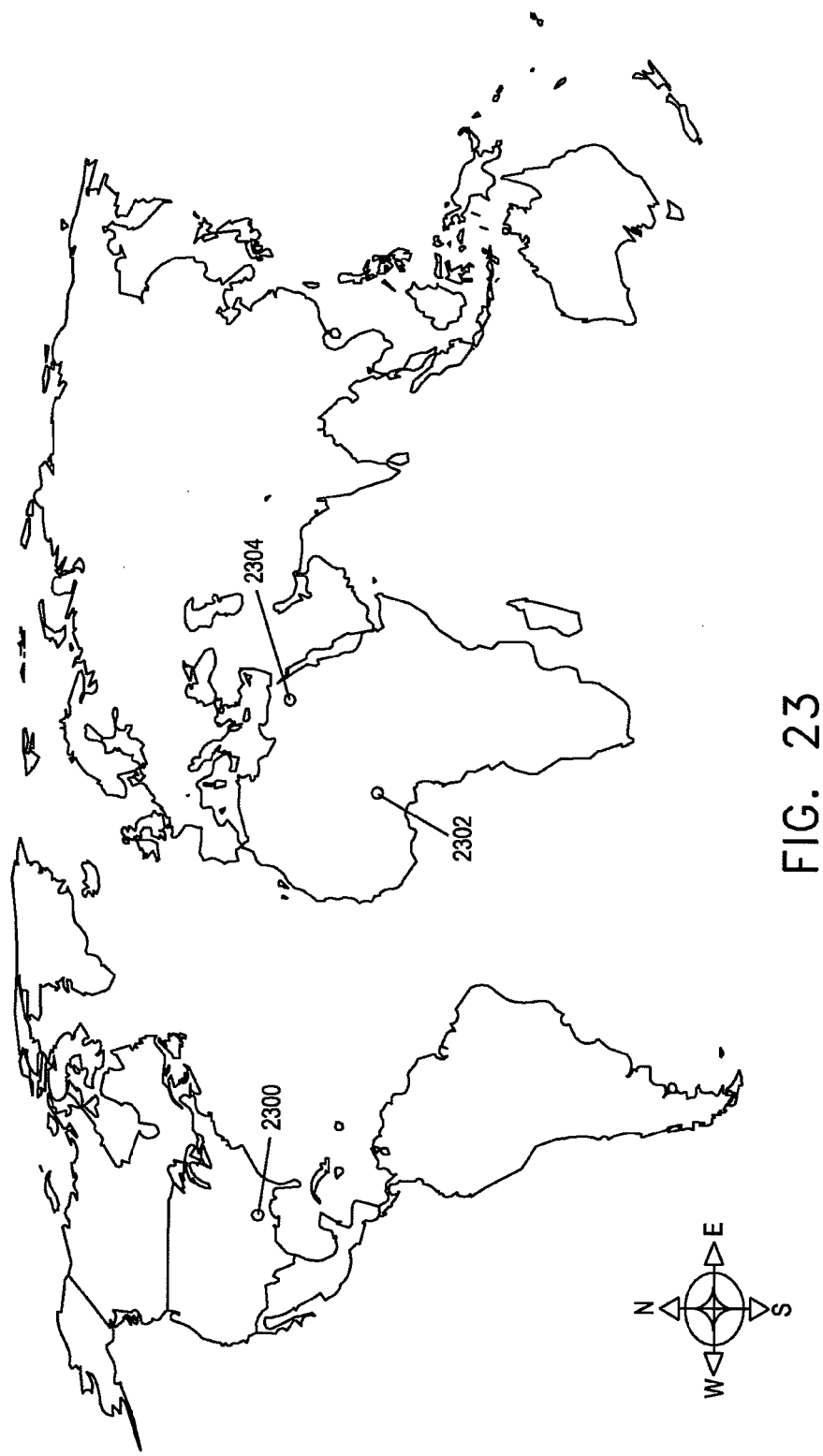
FIG. 23 is another example user interface according to one embodiment of the present invention that may be presented to a user by a remote device monitoring system to display a geographical representation of monitored devices.

In another embodiment, the external system which receives the device information may be the well-known Google Earth application commercially available from Google, Inc. of Mountain View, Calif. When so coupled, information regarding the geographic location of newly installed devices and escalated support events involving those devices may automatically flow from the devices into the Google Earth application. Monitoring center staff may then use the Google Earth application to obtain a geographic representation of their monitored device installed base, including the operating condition of the devices. This geographic representation may enable monitoring center staff to diagnose issues, such as power outages, that affect multiple devices and facilities. FIG. 23 illustrates one embodiment in which a geographic representation of a monitored device may be colored according to the operational condition of the device. For example, device 2300 may be colored green when the device is operating normally. Device 2302 may be colored yellow when it is operating in a warning state. Device 2304 may be colored red when it is operating in a critical state.

In yet another embodiment, RMS website 27 may include promotions module 40 which compares customer device information to device roadmaps and sales promotions to determine attractive upgrade plans for the customer. These upgrade plans may then be communicated to the customer when the customer accesses web portal 26.

In a further embodiment, RMS website 27 may expose an interface that enables monitoring center staff, or other authenticated users, to take corrective action by issuing device commands to devices 18. These commands may include, for example, modification of thresholds, turning devices on and off and modification of firmware versions, among other command types that perform other corrective actions.

Figure 2A:
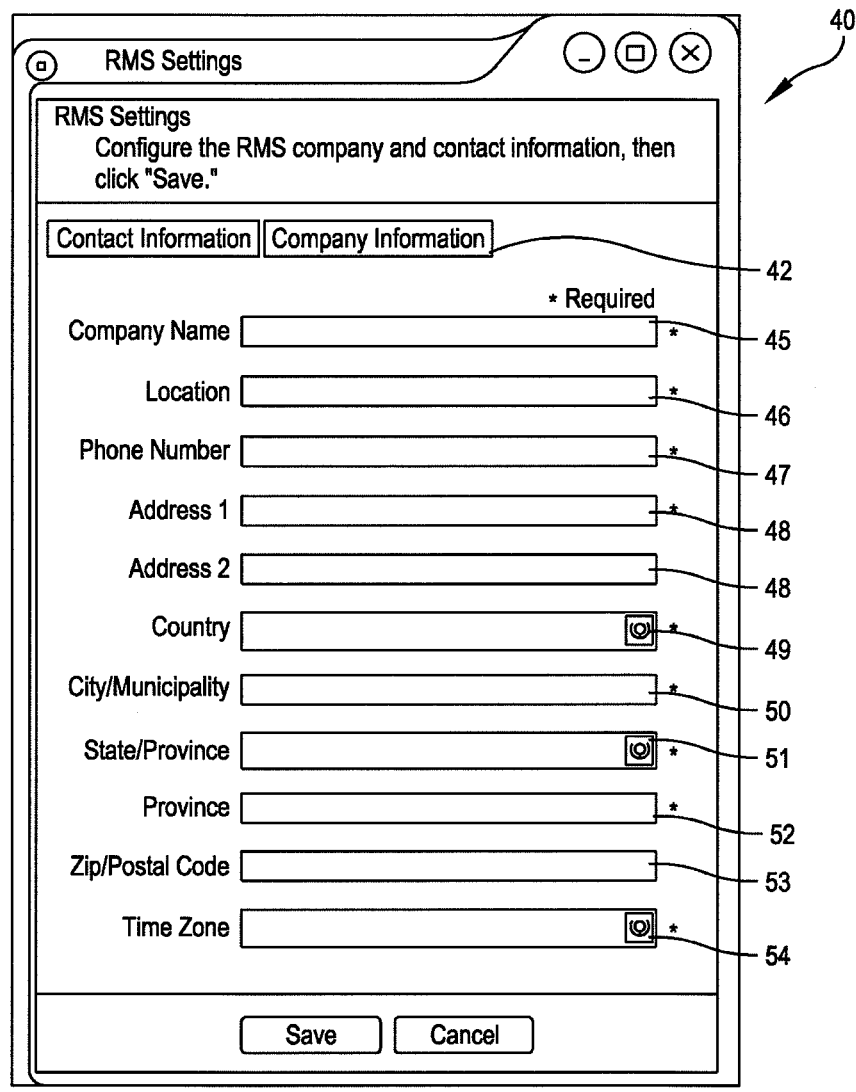
FIGS. 2A and 2B are exemplary screen displays for user registration associated with monitored locations.
Figure 2B:
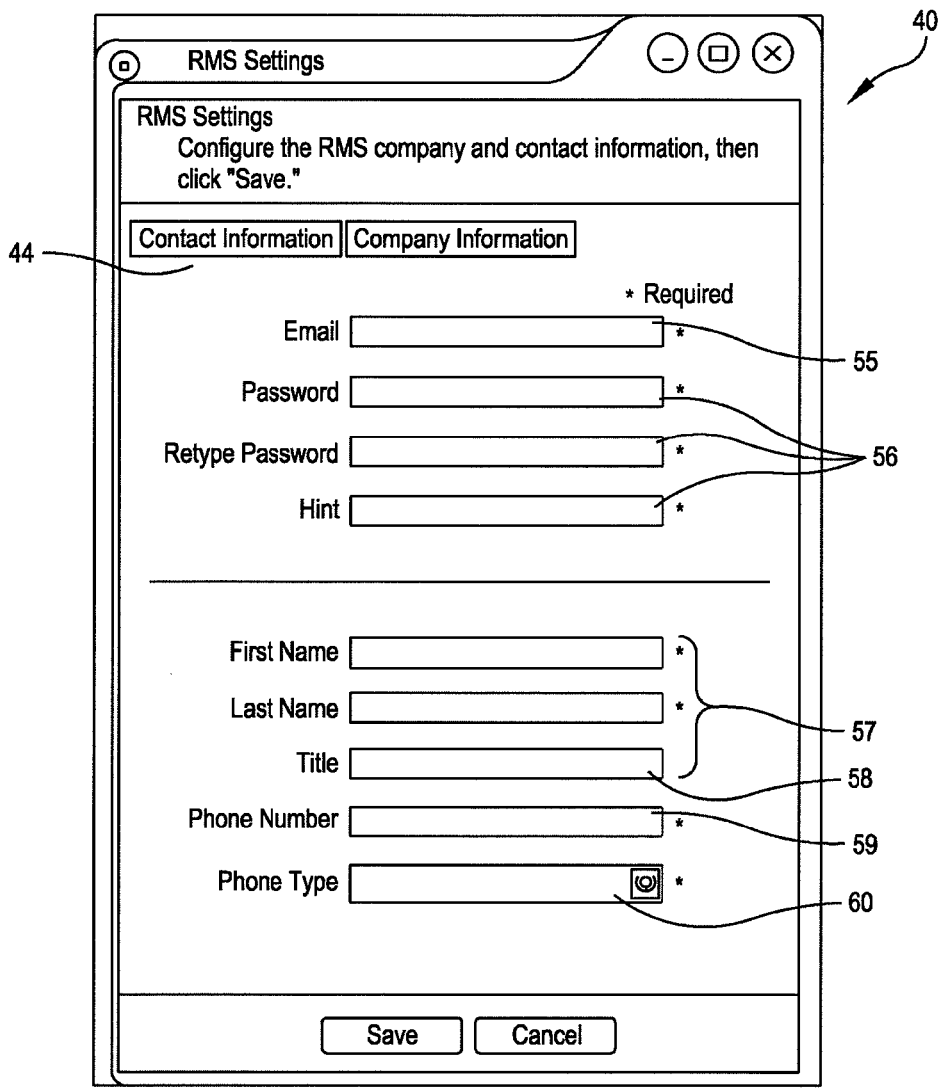

With continued reference to FIG. 1, and referring to FIGS. 2A-2B, a user having at least one device 18 registers for the monitoring system by completing profile data at the web portal 26. An RMS Settings screen 40 includes a company information page 42 and a contact information page 44. In one embodiment, company information page 42 may prompt a user for entry of a company name 45, a location 46, a phone number 47, an address 48, a country 49, a city 50, a state 51, a province 52, a zip code 53 and a time zone 54. Other fields can be included on the company information page 42 (e.g., fields suited for other countries).

The contact information page 44, shown in FIG. 2B, may be displayed to a user, and may prompt for entry of an email address 55, a password setting 56, a name 57, a title 58, a phone number 59 and a phone type 60. Data entered may be saved in the remote monitoring system database 30 or any other location. In one embodiment, data saved in the remote monitoring system database 30 may be accessible over the web portal 26 at the customer side and by the event manager 34 on the monitoring side. The RMS website 27 is accessed by the customer to update contact information. Customer information is sent to the monitoring center 16 from the monitored device 18 upon startup of the device 18.

In one implementation, customer information is XML formatted and is sent in an HTTP post and/or in an email message. Device registration may be completed automatically by associating the device 18 with a customer using knowledge of which device 18 (including unique identifiers, e.g., serial numbers) the customer is using or has purchased. As is known, XML is a self-describing computer language. XML allows the creation and format of custom document tags, as opposed to HTML which has fixed tags, e.g. <HEAD> and <BODY>. The exemplary customer XML template used to generate the customer registration information sent to the event manager may be structured similarly to the following example:

```
<?xrnl version="1 0 encoding"UTF-8"?>
<!--DTD generated by XMLSpy v4.4 U (http://www.xmlspy.com)-->
<!ELEMENT APCRMCustLink (Company+)>
<!ATTLIST APCRMCustLink
xmlns:xsi CDATA #REQUIRED
xsi:noNamespaceSchemaLocation CDATA #REQUIRED
>
<!ELEMENT Address1 EMPTY>
<!ELEMENT Address2 EMPTY>
<IELEMENT Company (CompanyName, CompanyPhone, LocationList,
DeviceContactList)>
<!ELEMENT CompanyName EMPTY>
<!ELEMENT CompanyPhone EMPTY>
<tELEMENT Contact (FirstName, LastName, EmailAddress, Password?,
Title, PhoneList)>
<!ATTLIST Contact
    Status (Active | Inactive) #REQUIRED
    Role (Admin | User) #REQUIRED
    Owner (False | True) #REQUIRED
>
<!ELEMENT ContactList (Contact+)>
<!ELEMENT CountryCode (#PCDATA)>
<!ELEMENT Device (DeviceDescription)>
<!ATTLIST Device
    Model CDATA #REQUIRED
    Identifier CDATA #REQUIRED
    ParentIdentifier CDATA #IMPLIED
>
<!ELEMENT DeviceContact EMPTY>
<!ATTLIST DeviceContact
EmailAddress CDATA #REQUIRED
Identifier CDATA #REQUIRED
Priority (1 | 2 | 3 | 4 | 5) #REQUIRED
>
<!ELEMENT DeviceContactList (DeviceContact+)>
<!ELEMENT DeviceDescription EMPTY>
<IELEMENT DeviceList (Device*)>
<!ELEMENT EmailAddress EMPTY>
<!ELEMENT FirstName EMPTY>
<!ELEMENT LastName EMPTY>
<!ELEMENT Location (LocationName, Address1, Address2?,
Municipality, Region, PostalCode, CountryCode, Timezone,
ContactList, DeviceList)>
<!ELEMENT LocationList (Location+)>
<!ELEMENT LocationName EMPTY>
<!ELEMENT Municipality EMPTY>
<!ELEMENT Password EMPTY>
<!ELEMENT Phone EMPTY>
<!ATTLIST Phone
    Type (cell | fax | home | office | phone) #REQUIRED
>
<!ELEMENT PhoneList (Phone+)>
<!ELEMENT PostalCode EMPTY>
```

-continued

```
<!ELEMENT Region EMPTY>
<!ELEMENT Timezone EMPTY>
<!ELEMENT Title EMPTY>
```

Various embodiments of a computer-based interface enabling entry and maintenance of company profile data are illustrated in FIGS. 7-14. In one embodiment, a Profile Wizard may be exposed through web portal 26 as shown in FIG. 1 and may be displayed in a window of a general-purpose computer as discussed below with reference to FIG. 24. As discussed herein, the "Profile Wizard" is a utility within a software application that permits the user to manage company contact and monitored device information.

The Profile Wizard may be developed using well-known Internet technologies such as Java, Java Script, AJAX, HTML and XML. Although various aspects of the invention may be developed using browser-based computing tools, it should be appreciated that any programming language, framework, or environment may be used, and the invention is not limited to any particular implementation.

The Profile Wizard may guide the user through the process of creating a company profile and may include screens 700-714 which prompt the user to enter company profile information. Some user interface elements with similar functionality may be depicted with a similar appearance on multiple Profile Wizard screens. These common elements may include navigation elements 728, 820 and 700-722 and screen information section 726. Navigation elements 700-714 may allow the user to navigate, respectively, to welcome screen 700, company screen 800, facilities screen 900, contacts screen 1000, users screen 1100, devices screen 1200, preferences screen 1300 and validation screen 1400. Navigation elements 716-722 may lead, respectively, to system administration functionality, company home page 600, and help documentation. When actuated, user interface element 722 may log the user off of the system. Screen information section 726 may present the user with helpful information regarding the Profile Wizard screen currently displayed. Navigation element 728 may allow the user to move to the next Profile Wizard screen. As is common in the art, the user interface may highlight any information that is required by the system and the system may restrict the choices presented to the user for entry of certain types of information.

Figure 7:
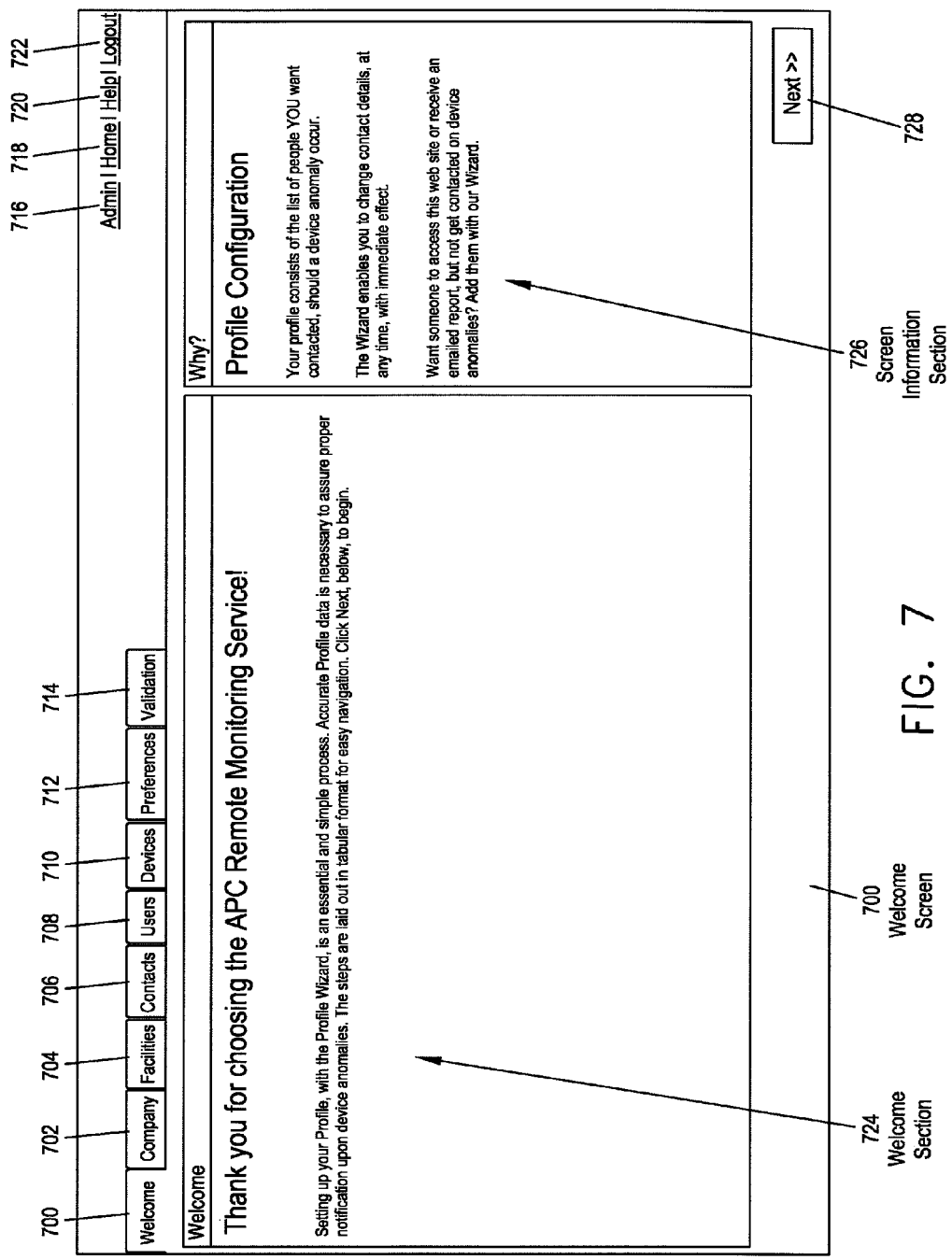
FIG. 7 is another example user interface according to one embodiment of the present invention that may be presented to a user by a remote device monitoring system to explain system functionality.

Specifically with regard to FIG. 7, welcome section 724 may greet the user with information regarding the system and the purpose of the Profile Wizard.

Figure 8:
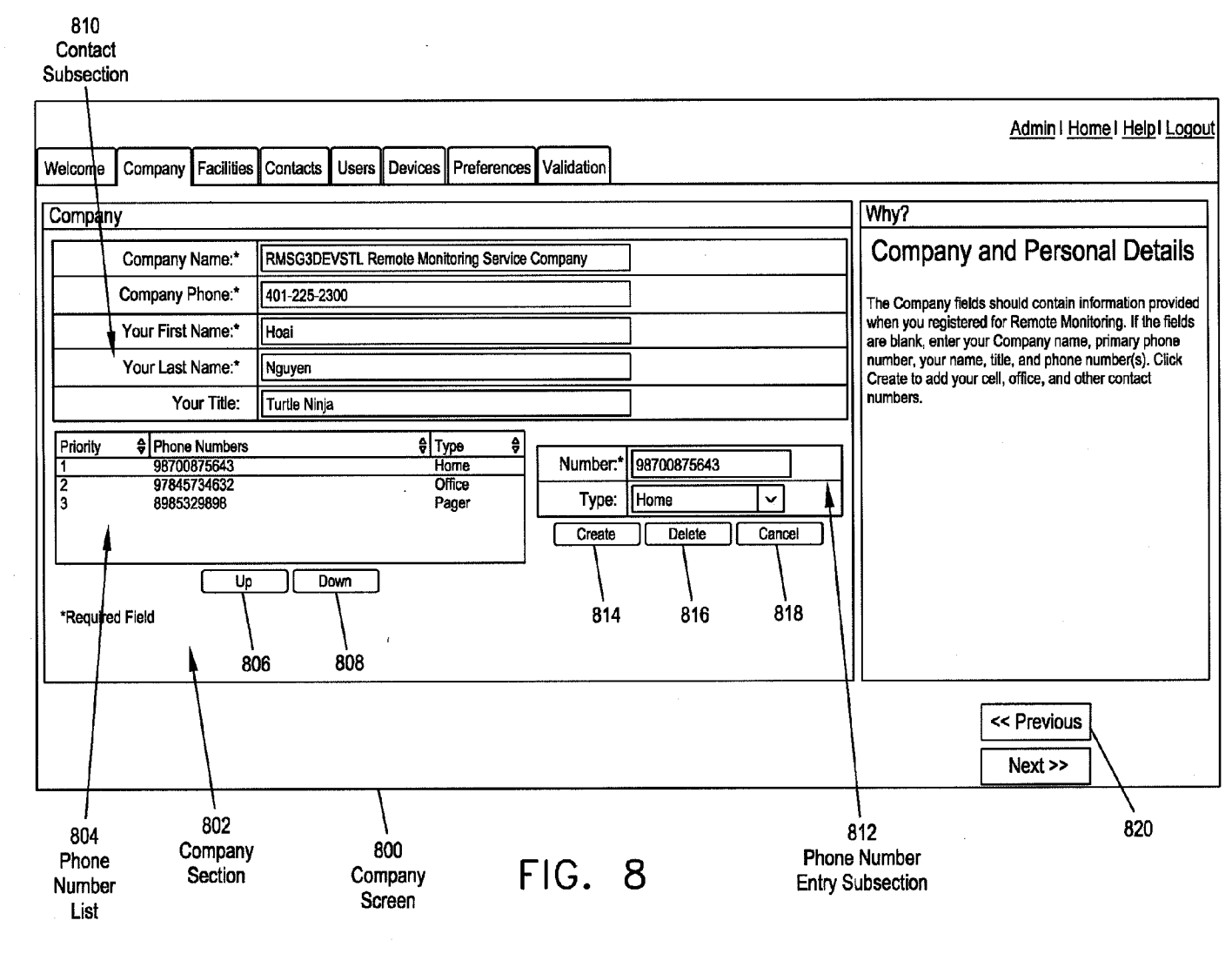

FIG. 8 illustrates a Profile Wizard screen that may be directed toward gathering information regarding a company that owns the monitored device and an individual at the company who is responsible for maintain the device profile, i.e. a company contact. Company screen 800 may include company section 802 and additional common navigation element 820. Navigation element 820 may allow the user to move to a previous Profile Wizard screen. Company section 802 may include several user interface elements, including phone number list 804, phone number priority assignors 806 and 808, contact subsection 810, phone number entry subsection 812 and phone number entry user interface elements 814, 816 and 818.

Contact subsection 810 may display or, when used in conjunction with phone number entry subsection 812 below, enable additions or changes to company contact identification information. This information may include the company contact's name, title and company.

Phone number entry subsection 812 may enable the user to record and associate new phone numbers with a company contact. After entering a phone number and the type of phone line identified by the phone number, e.g. cell, home, pager, etc., the user may record the phone number, and the associated company contact, by actuating user interface element 814. Similarly, after selecting a recorded and associated phone number in phone number list 804, the user may erase the selected phone number by actuating user interface element 816. Finally, the user may abort recordation or erasure by actuating user interface element 818.

As discussed above, phone number list 804 may present recorded phone numbers associated with a company contact. Phone number list 804 may show each recorded phone number, the order in which each phone number should be called (priority ranking), and the phone line type. By selecting a particular phone number from the list and actuating user interface element 806, the user may increase the priority ranking of the selected phone number relative to the other recorded and associated phone numbers. Similarly, by actuating user interface element 808, the user may decrease the priority ranking of the selected phone number.

Figure 9:
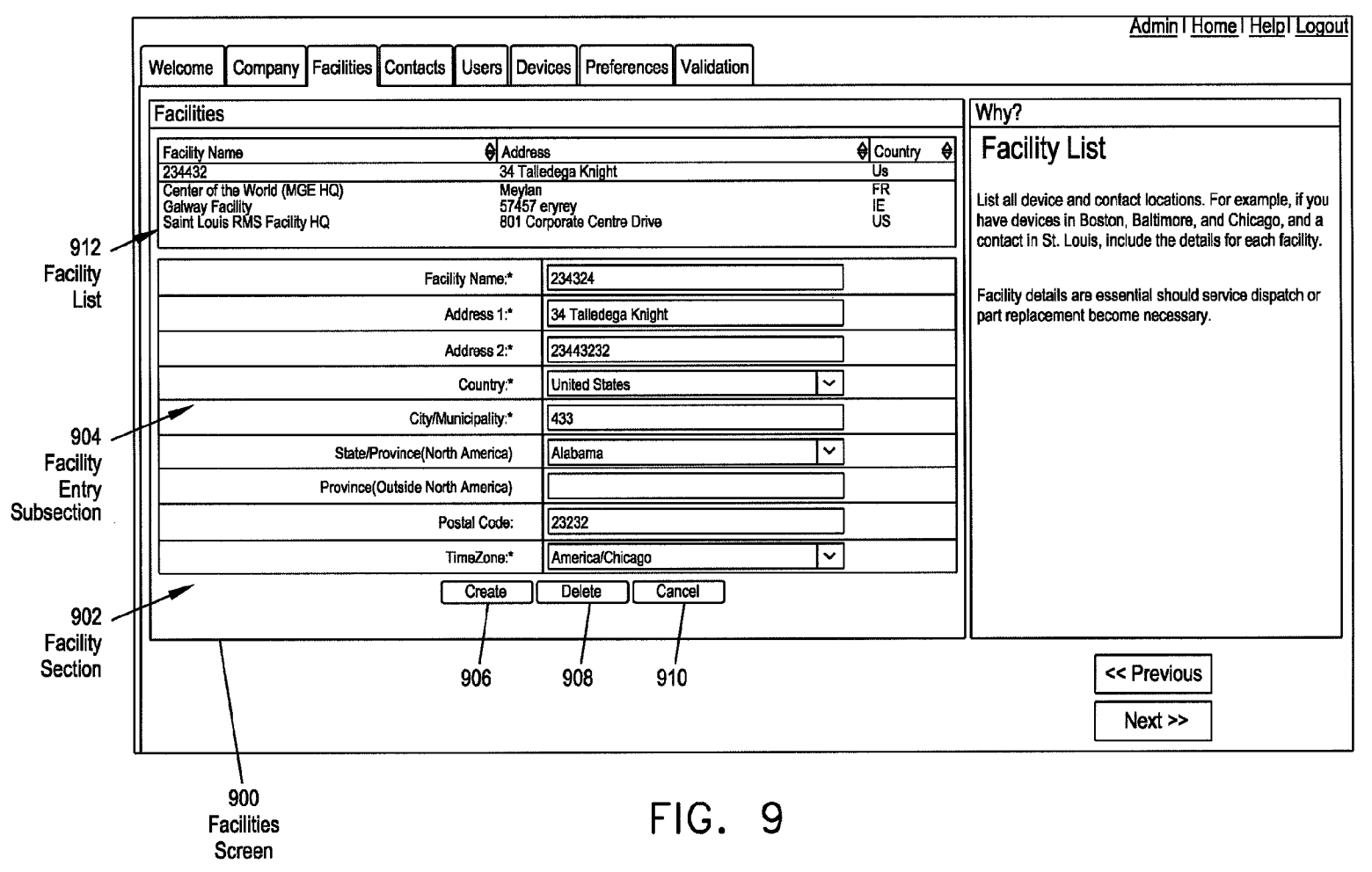

FIG. 9 depicts a Profile Wizard screen for gathering information regarding facilities that a company operates. Facilities screen 900 may include facility section 902. Facility section 902 may include facility entry subsection 904, facility list 912 and user interface elements 906-910.

Facility entry subsection 904 may permit the user to add or modify facilities associated with a company profile. This information may include facility name, address, country, city, state or province, postal code and time zone. Once any required information has been entered, the user may record the facility information and associate it with the company profile by actuating user interface element 906. Similarly, after selecting a recorded and associated facility in facility list 912, the user may erase the selected facility information by actuating user interface element 908. Lastly, the user may abort recordation or erasure by actuating user interface element 910.

Facility list 912 may display a list of recorded facilities that are associated with the company profile.

Figure 10:
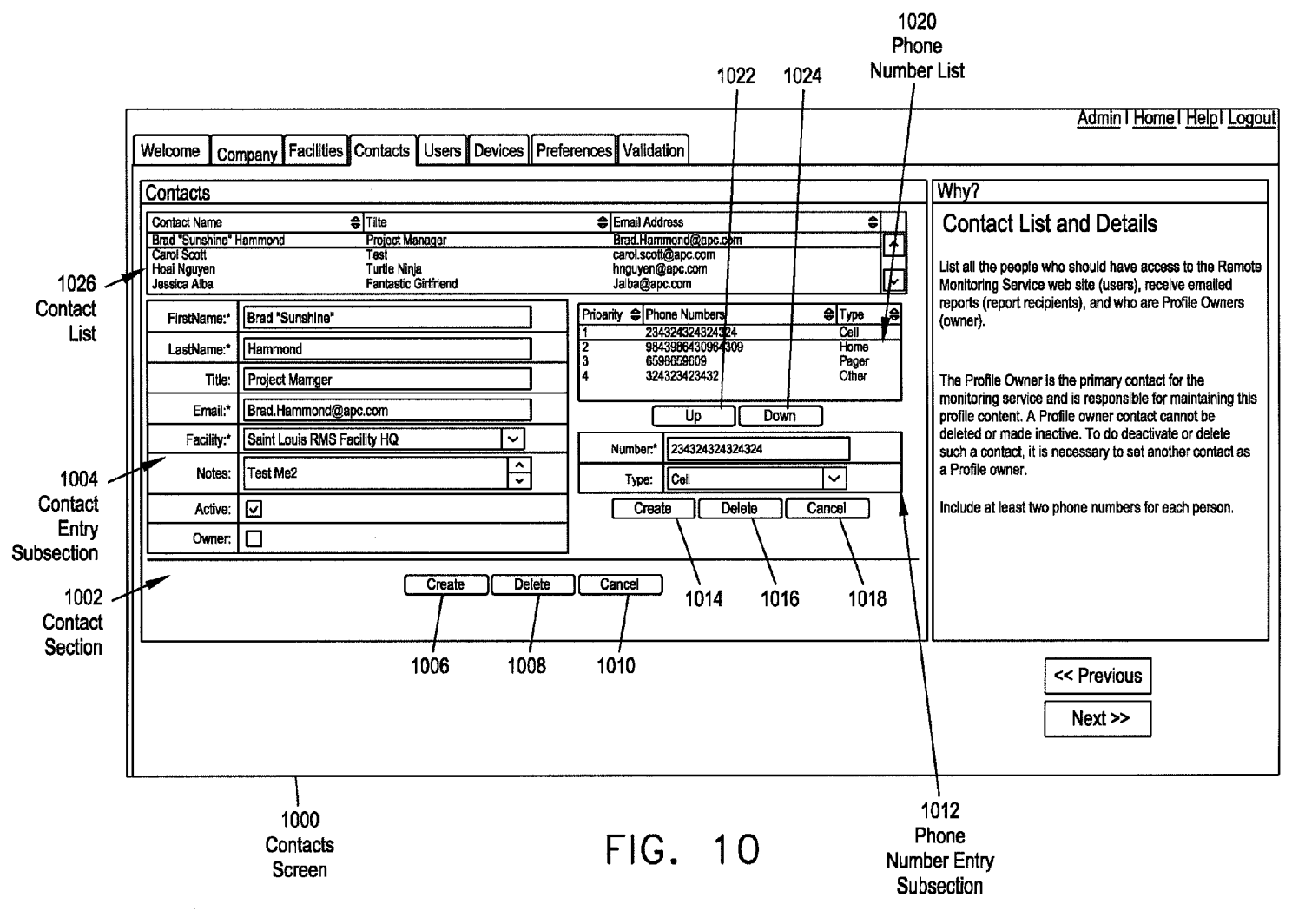

FIG. 10 shows a Profile Wizard screen for gathering information regarding contact personnel associated with the company profile. Contacts screen 1000 may include contact section 1002. Contact section 1002 may include contact entry subsection 1004, phone number entry subsection 1012, phone number list 1020, contact list 1026 and user interface elements 1006-1008, 1014-1018 and 1022-1024.

Contact entry subsection 1004 may permit the user to add or modify contacts associated with the company profile. This information may include contact name, title, email address, facility, any comment or notes, whether the contact is active and whether contact is responsible for maintaining company profile regarding a monitored device. Once any required information has been entered, the user may record the contact information and associate it with the company profile by actuating user interface element 1006. Similarly, after selecting a recorded and associated contact in contact list 1026, the user may erase the selected contact information by actuating user interface element 1008. Lastly, the user may abort recordation or erasure by actuating user interface element 1010.

Phone number entry subsection 1012 may enable the user to record and associate new phone numbers with a contact. After entering a phone number and the phone line type, the user may record the phone number and associate it with the contact currently selected in contact list 1026 by actuating user interface element 1014. Similarly, after selecting a recorded and associated phone number in phone number list 1020, the user may erase the selected phone number by actuating user interface element 1016. Finally, the user may abort recordation or erasure by actuating user interface element 1018.

As discussed above, phone number list 1020 may present recorded phone numbers associated with a contact. Phone number list 1020 may show each recorded phone number, the priority ranking, and the phone line type. By selecting a particular phone number from the list and actuating user interface element 1022, the user may increase the priority ranking of the selected phone number relative to the other recorded and associated phone numbers. Similarly, by actuating user interface element 1024, the user may decrease the priority ranking of the selected phone number.

Contact list 1026 may display a list of recorded contacts that are associated with the company profile.

FIG. 11 illustrates a Profile Wizard screen for gathering information regarding individuals in the company that will be system users. Users screen 1100 may include user section 1102. User section 1102 may include user entry subsection 1104, user list 1112 and user interface elements 1106-1110.

User entry subsection 1104 may allow the user to add or modify users associated with a company profile. This information may include contact name, user login, user password, a hint for remembering the password, the user's temperature measurement preference for reporting purposes, user role and whether the user is active. Once any required information has been entered, the user may record the user information and associate it with the company profile by actuating user interface element 1106. Similarly, after selecting a recorded and associated user in user list 1112, the user may erase the selected user information by actuating user interface element 1108. Lastly, the user may abort recordation or erasure by actuating user interface element 1110.

User list 1112 may display a list of recorded users that are associated with the company profile.

Figure 12:
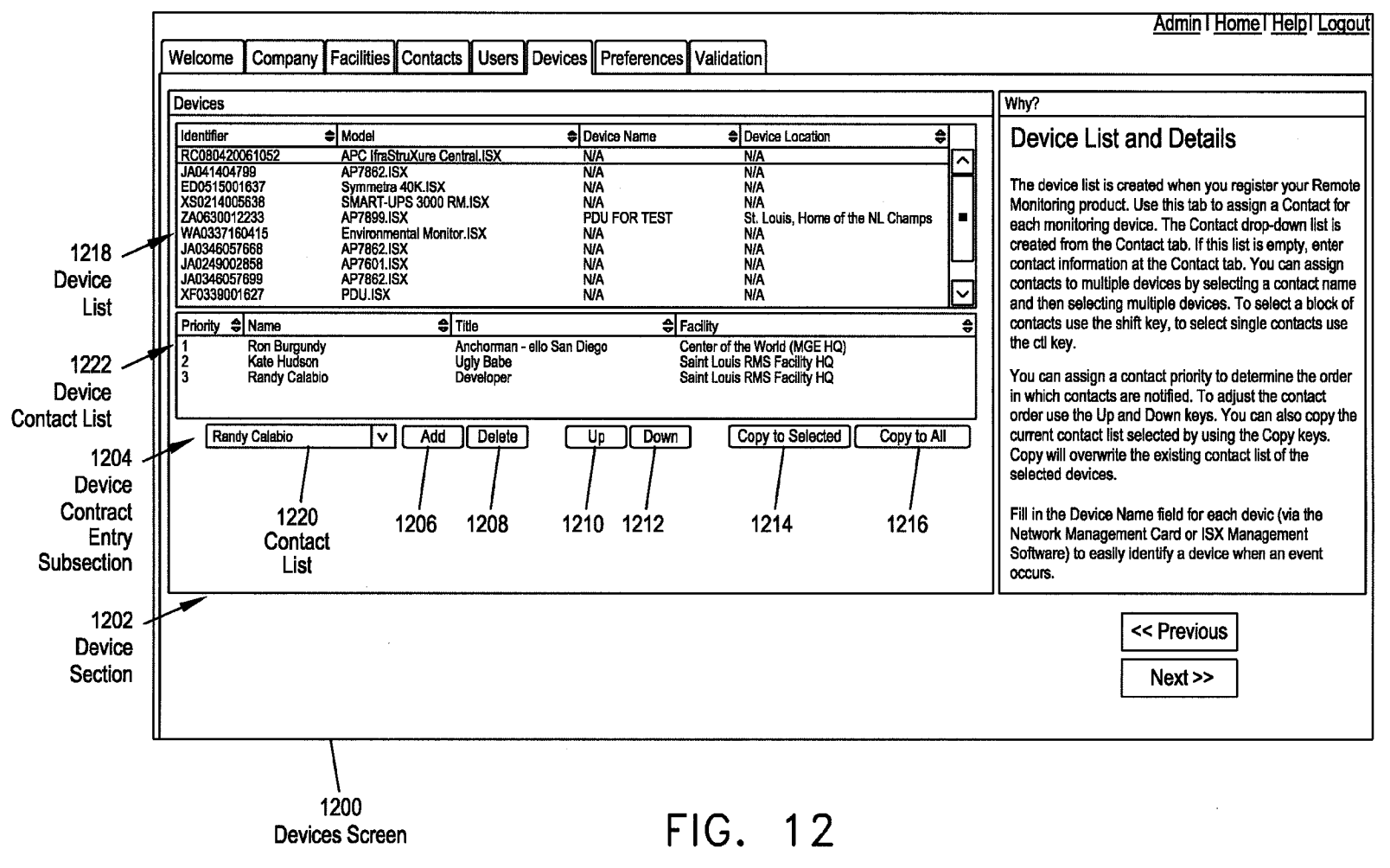

FIG. 12 depicts a Profile Wizard screen for associating contacts with monitored devices. Devices screen 1200 may include device section 1202. Device section 1202 may include device contact entry subsection 1204, device list 1218, contact list 1220, device contact list 1222 and user interface elements 1206-1216.

Device list 1218 may list all monitored device associated with the company profile, and contact list 1220 may list all contacts associated with the company profile.

Device contract entry subsection 1204 may enable the user to associate a contact with a device. In one embodiment, this association may be a many-to-many relationship, meaning that a single device may be associated with multiple contacts and a single contact may be associated with multiple devices. To associate one or more contacts with one or more devices, the user may first add contacts from contact list 1220 to device contact list 1222. The user may add multiple contacts to device contact list 1222 by repeatedly selecting contacts from contact list 1220 and actuating user interface element 1206 until device contact list 1222 lists the desired contacts. The user may remove a contact from contact list 1222 by selecting the contact in device contact list 1222 and actuating user interface element 1208.

Once device contact list includes the desired contacts, the user may increase the priority ranking of the selected contact relative to the other recorded and associated contacts by selecting the contact from device contact list 1222 and actuating user interface element 1210. Similarly, by actuating user interface element 1212, the user may decrease the priority ranking of the selected contact.

Once the device contact list includes the desired contacts in the proper priority ranking, the user may assign the contact list to one or more devices selected in device list 1218 by actuating user interface element 1214. The user may assign the current contact list to all 1218 devices by actuating user interface element 1216.

Figure 13:
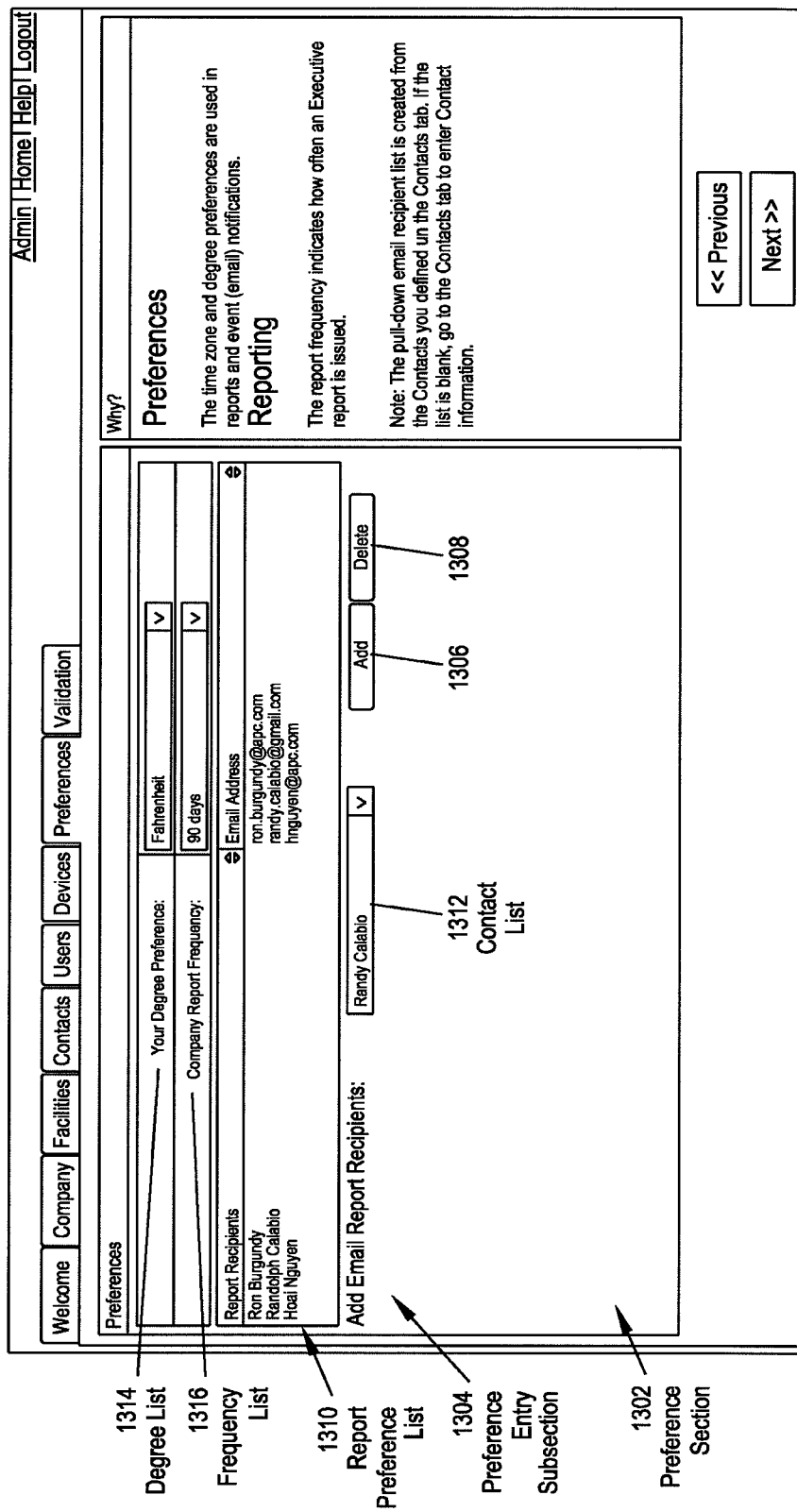
FIG. 13 is another example user interface according to one embodiment of the present invention that may be presented to a user by a remote device monitoring system to enter reporting preferences information.

FIG. 13 shows a Profile Wizard screen for adding users to a list of those that receive automatic system generated reports and configuring reporting preferences. Preferences screen 1300 may include preference section 1302. Preference section 1302 may include preference entry subsection 1304, report recipient list 1310, contact list 1312 and user interface elements 1306-1308.

Preferences section 1302 may allow the user add a contact selected in contact list 1312 to report recipient list 1310 by actuating user interface element 1306. Similarly, the user may remove a contact from report recipient list 1310 by selecting the contact in report recipient list 1310 and actuating user interface element 1308. Lastly, degree list 1314 and frequency list 1316 may allow the user to specify these reporting preferences for the contact currently selected in report recipient list 1310.

Contact list 1312 may list all of the contacts associated with the company profile and report recipient list 1310 may list all of the contacts that have been designated to receive automatically generated system reports. Degree list 1314 may list all of the temperature measurement standards supported by the system and frequency list 1316 may list all of the report frequencies support by the system. In one embodiment, the system can support degrees Fahrenheit and Celsius and reporting frequencies include 30 days and 90 days.

Figure 14:
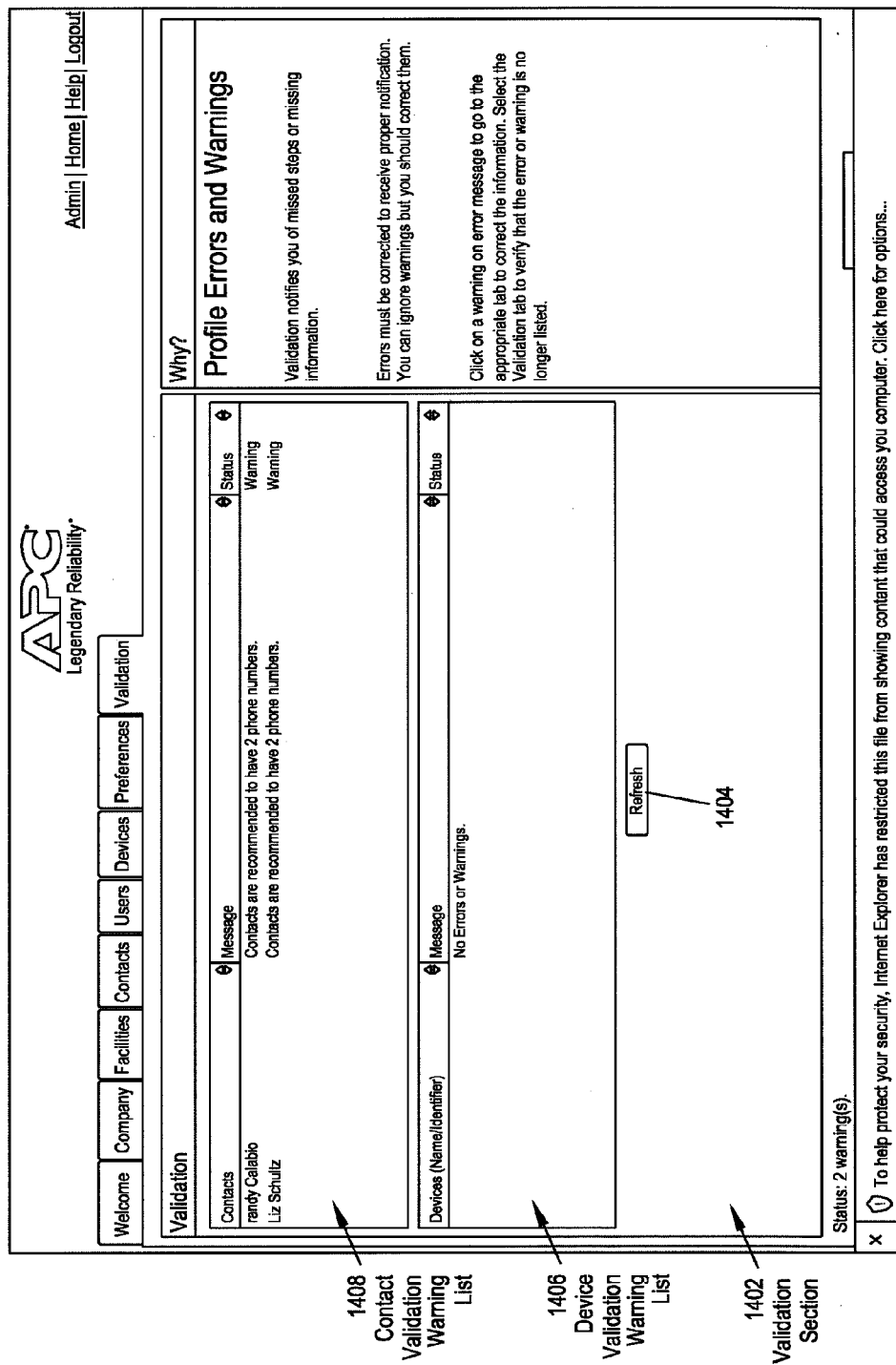
FIG. 14 is another example user interface according to one embodiment of the present invention that may be presented to a user by a remote device monitoring system to validate company profile information.

FIG. 14 illustrates a Profile Wizard screen for displaying the validity of the company profile. Validation screen 1400 may include validation section 1402. Validation section 1402 may include device validation warning list 1406, contact validation warning list 1408 and user interface elements 1404.

Validation section 1402 may allow the user to evaluate the validity of the company profile as currently configured by actuating user interface element 1404. Device validation warning list 1406 may include devices for which are associated with fewer than 3 contacts. Contact validation warning list 1408 may include contacts which are associated with fewer than 2 phone numbers.

Figure 3B:
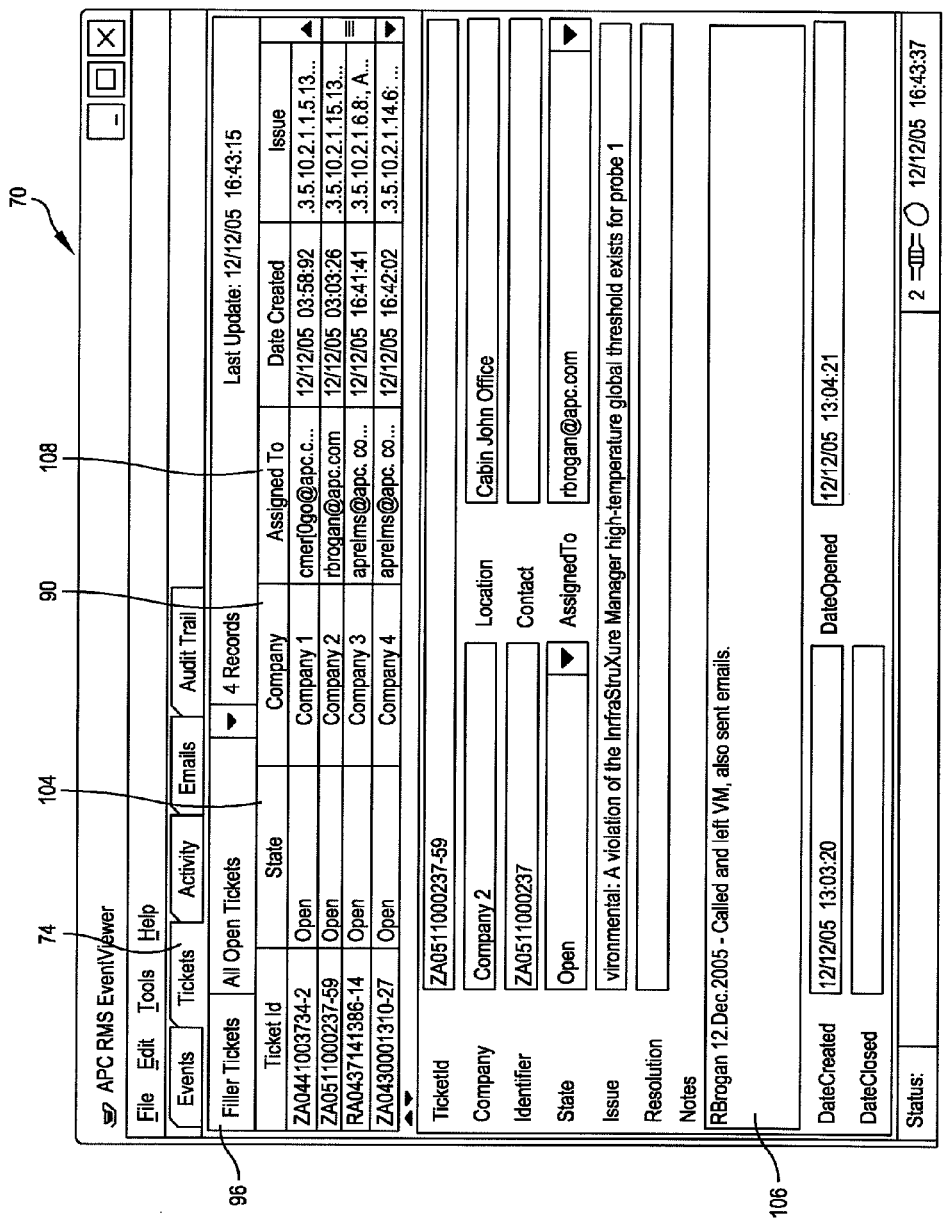
Figure 3C:
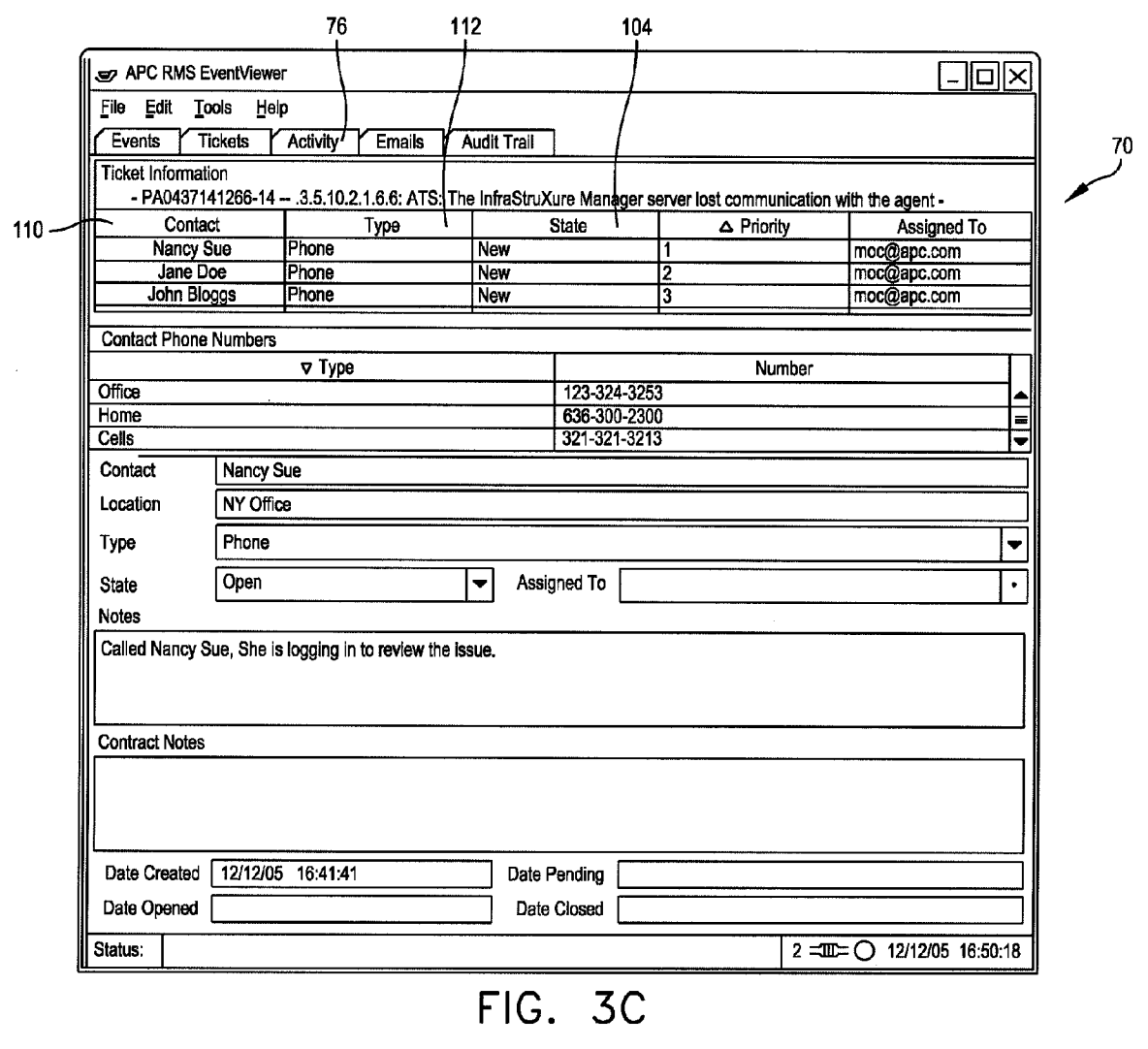

Referring to FIGS. 3A-3C, the event manager 34 is used by the remote monitoring center 16 to assess device status. The event viewer screen 70 provides a synopsis of data related to a device 18 for review at the event manager 34. Preferably, the event viewer screen 70 provides data on a number of customers per screen. The RMS event viewer screen 70 is accessible at the event manager 34. The event viewer screen 70 includes an events page 72 (FIG. 3A), a tickets page 74 (FIG. 3B), and an activities page 76 (FIG. 3C). The event viewer screen 70 can include an emails page 78, an audit trail page 80 and a callbacks page (not shown), as well as other pages. In FIG. 3A, a snapshot of the events page 72 includes fields for a company name 90, an identifier 92, an event description field 94, ticketID 96, a ticket state field 98, a count 100 and a date field 102. Information on the screen 72 can be filtered by any of the fields 90, 92, 94, 96, 98, 100 and 102. For example, in FIG. 3A, data are filtered by company name 90. In FIG. 3A, events 71 are color coded and can be sorted by level of importance for visual inspection, i.e., such that the most severe events can be visually identified quickly. For example, severe events 73 can appear in red, while less severe events 75 can appear in blue, with different colors representing gradations of severity in between. Severe events automatically create trouble tickets which outline the escalation process specific to an event 94. An operator at the monitoring center 16 selects an event 71, follows the escalation steps, adds notes, creates bulletin boards and closes out open tickets in the ticket state field 98.

In FIG. 3B, information is sorted by open tickets 104. A selected open ticket 104 presents profile information for the customer 90, as well as notes 106 related to the status of the device 18. Each open ticket 104 is assigned to a service individual 108 residing at the monitoring center 16. Data related to the event, such as the frequency of the occurrence, the urgency and the device data are presented on the event viewer 70. Service is provided from the assigned individual 108 based on the event viewer 70 data. In FIG. 3C, activity related to a particular ticket identification can be viewed. A company contact 110 and mode of contact 112 are available to the service individual. The contact 110 can be contacted directly, or via passive means where indicated. The contact information is that collected from the website 27, where the customer has registered.

FIG. 18 shows another embodiment in which event manager may include special highlighting for events that require replacement parts, service dispatch, firmware upgrades or other issues that require temporary escalation. In the depicted embodiment, this special highlighting may include escalation column 1802 and the coloring of rows representing escalation events. In one embodiment, event manager may be displayed in a window of a general-purpose computer as discussed below with reference to FIG. 24.

According to one embodiment of the present invention, an external system (e.g. a Siebel CRM system), may initiate an action in response to an event (e.g. an escalation event) provided by the event manager and/or device. According to one aspect of the invention, a monitoring service may provide information to a CRM application. Conventionally, CRM systems are stand-alone applications or, at most, provide information to other applications. According to one embodiment, a monitoring system provides data to a CRM application, permitting the creation of a dynamic picture of customer's network from within the CRM application.

According to another embodiment of the present invention, events or alarms may be "tagged" that require replacement/repair of a monitored device. According to one embodiment, the system may determine automatically whether there should be some type of escalated action performed for a monitored device. Such an action may be taken, for example, by an inspection of escalation information associated with a particular device and/or event, triggering an upgrade of software or firmware, displaying an alert to an event viewer application, or other action. In one example, the device may be modified to report which event might require an escalation. Conventionally, an operator must make a judgment decision as to whether a particular device is repaired or replaced.

Figure 4:
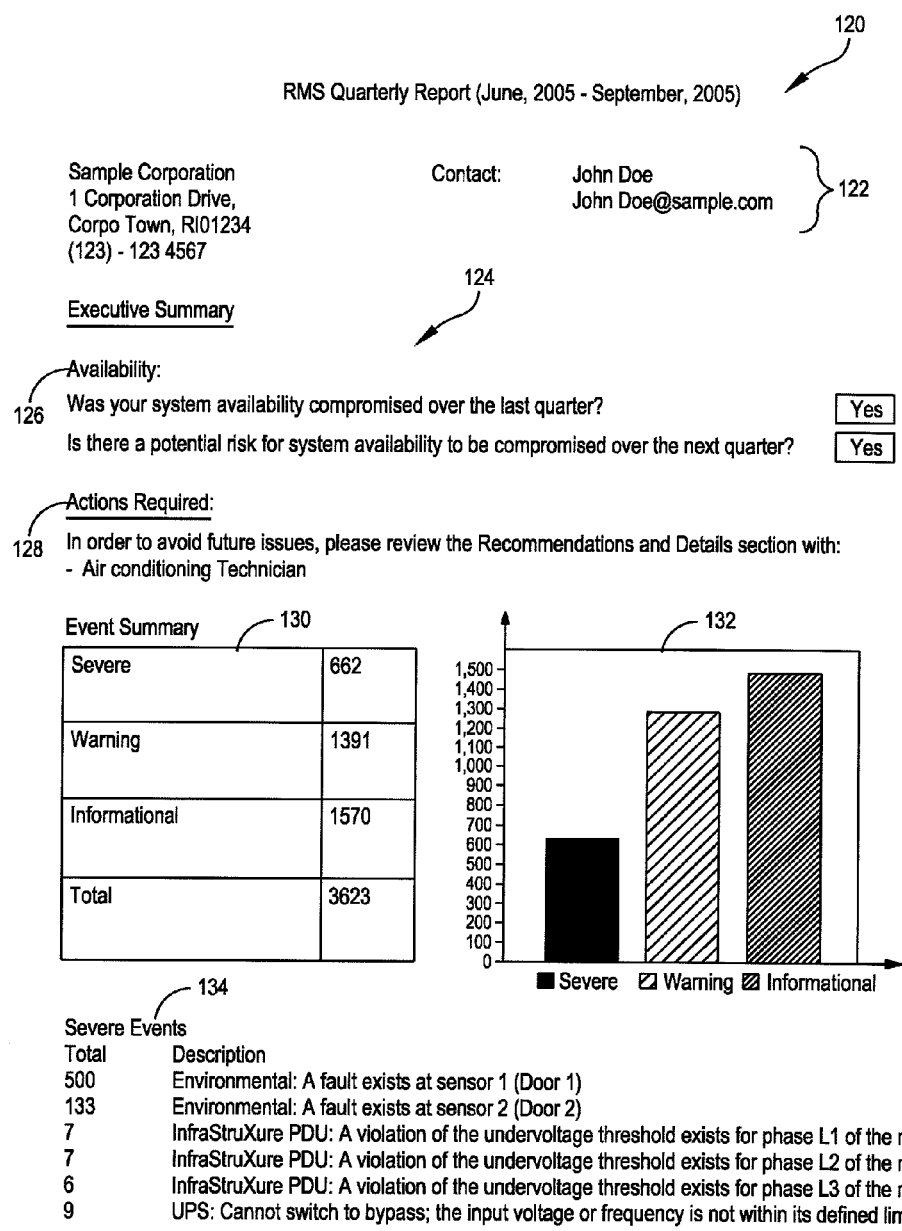
FIG. 4 is an exemplary report of status information associated with a monitored location.

Referring to FIG. 4, a report is generated based on the data collected at the event manager 34. The report 120 includes an executive summary and details of the activity for a customer's devices 18 over a week, a month, a quarter, or a year. The report 120 can be generated over another specified duration, such as more frequently than a quarter, or less frequently than a quarter.

The report 120 includes a contact portion 122 and an executive summary 124. An executive summary 124 includes a system availability analysis 126. The actions required section 128 provides a brief synopsis for the customer for any actions pending. The event summary includes an event summary table 130 and visual graph 132 showing the occurrence of severe, warning, informational and total events over the given time period. The report 120 also includes a severe events synopsis 134. A recommendations section 136 can, for example, include event manager recommendations to improve the efficiency of the devices 18 or to alter the system at a customer site.

The report 120 also includes a details section 138. The details section 138 provides a snapshot of an identified device and its parameters over the time period, For example, the details section 138 can include a breakdown of device activity for UPSs 140, PDUs 142 and Environments 144 present at a customer site, or other numbers of such tables. Information, such as load percentage, runtime, balanced systems, power, and temperature and humidity are summarized in the device activity tables 140, 142 and 144. The report 120 can include as many or as few device activity tables as there are devices/systems at the customer site. System evaluation is possible via the periodic reports 120. The customer or user accesses the report 120 via the RMS website 27.

Figure 4A:
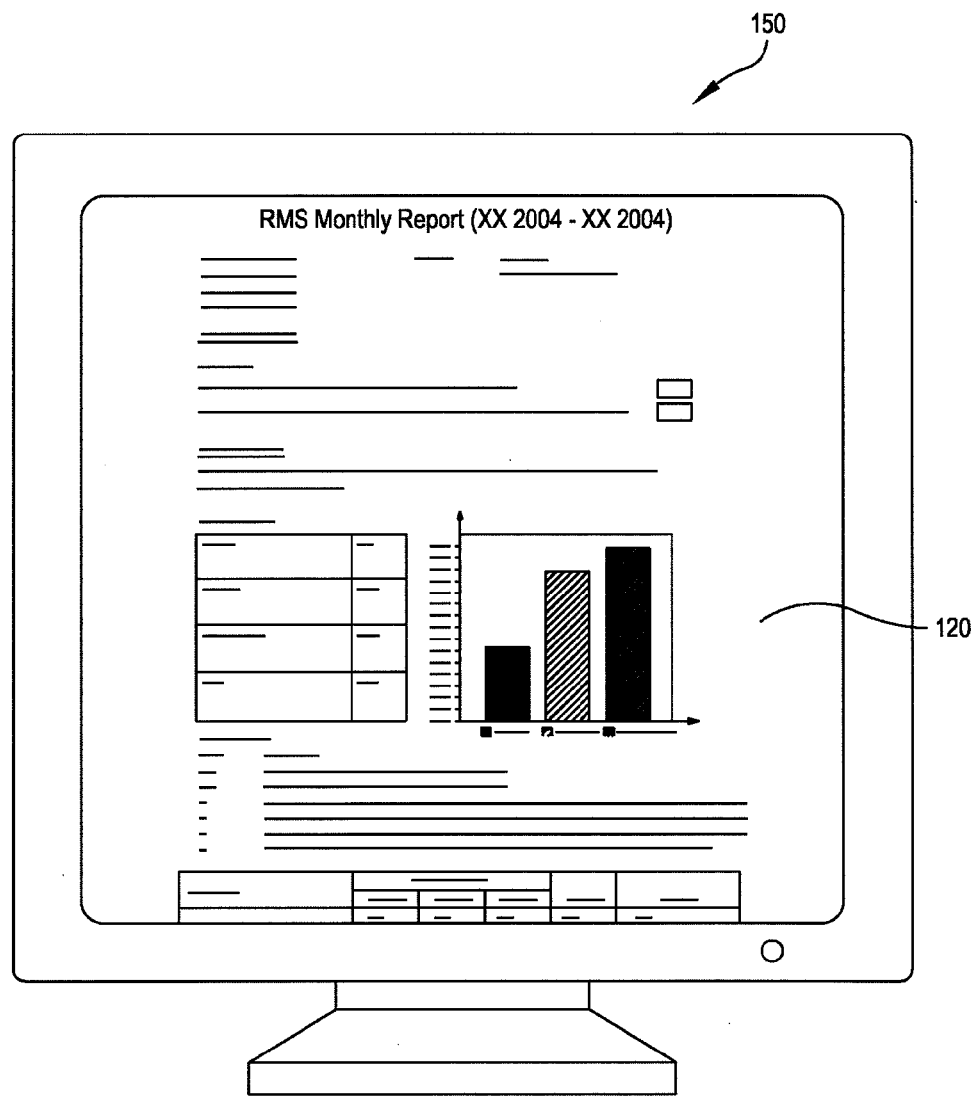
FIG. 4A is a computer monitor showing an exemplary report of status information as described in FIG. 4.

Referring to FIG. 4A, a computer monitor 150 includes the report 120 as a screen view. The report 120 may be arranged in a number of formats for presentation to the user. For example, the Contact data 122, executive summary 124, availability 126, actions required 128, event summary 130, graph 132, severe events summary 134, recommendations 136, and details 138 sections can be arranged in any order within the report 120. Different presentation formats, e.g., line graphs, pie charts, stacked bar charts, etc., may be used to provide the information. Further, additional information can be added or removed based on the event activity for the specified time period.

The remote monitoring system 10 and reporting system can be used for a variety of applications. An exemplary use of the system 10 is to provide an integrated monitoring system for use at a customer site. The customer site 12 can include one or more devices in the monitoring scheme. The system 10 can be integrated into an environment where a user has a separate monitoring center staff, rather than utilizing a centralized monitoring staff. These examples are not limiting, as other applications are within the scope of the invention.

Figure 6:
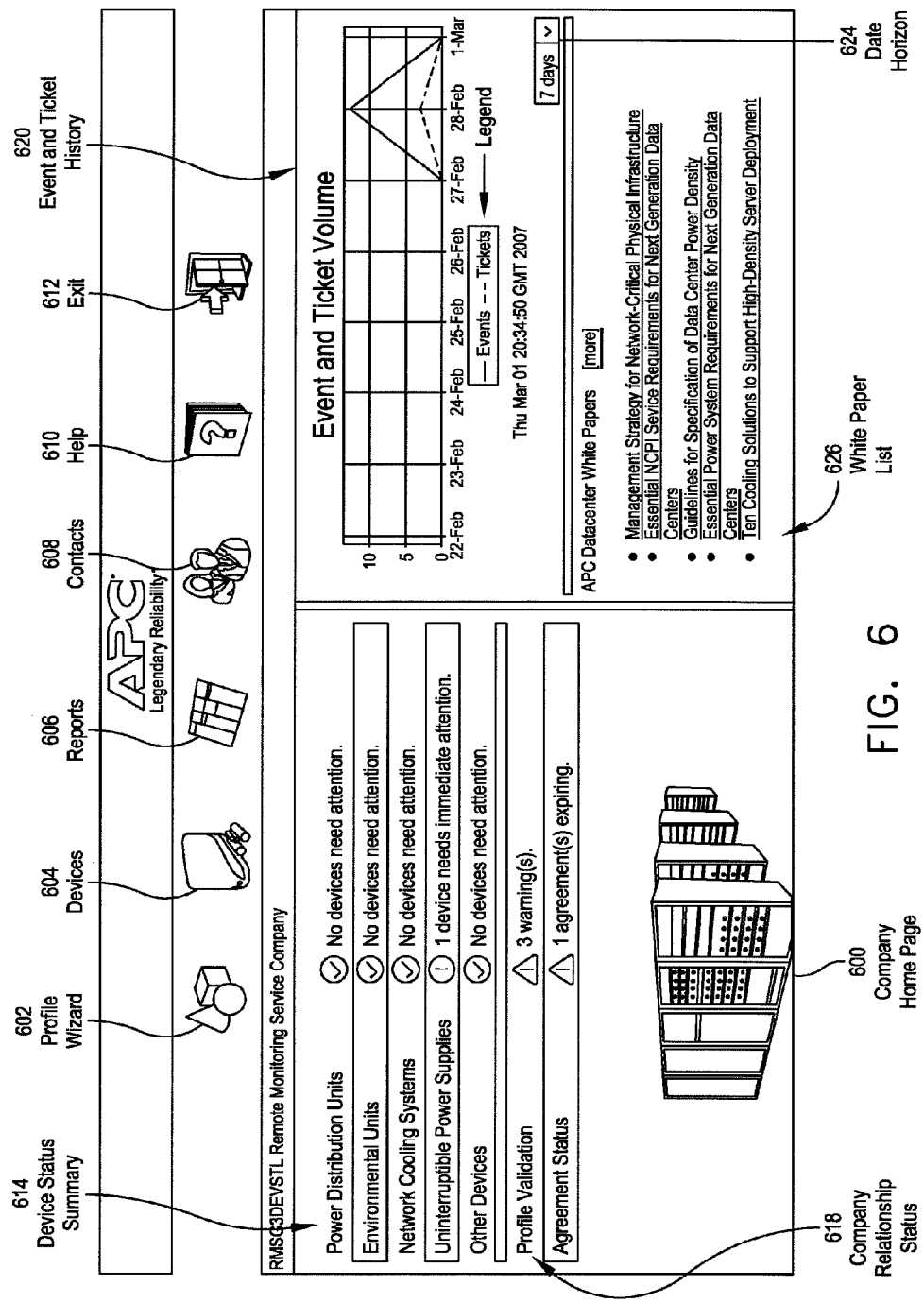
FIG. 6 is an example user interface according to one embodiment of the present invention that may be presented as a company home page to a user by a remote device monitoring system.

FIG. 6 depicts example company home page user interface 600, which may allow the user to evaluate the recent history and current condition of monitored devices and access various system functions. In one embodiment, this interface may be displayed in a window of a general-purpose computer as discussed below with reference to FIG. 24.

Company home page 600 may be developed using well-known Internet technologies such as Java, Java Script, HTML and XML. In one embodiment, company home page 600 may be created using the well-known ZK AJAX technologies available from the Potix Corporation. Although various aspects of the invention may be developed using browser-based computing tools, it should be appreciated that any programming language, framework, or environment may be used, and the invention is not limited to any particular implementation.

Company home page 600 may include navigation elements to other system pages 602-610, which present the user with various system functions as discussed below, and exit element 612 that allows the user to log off the system. Company home page 600 may also include device summary status section 614, company relationship status section 618, event and ticket history section 620 and white paper list 626, each of which is discussed in further detail below. Typically, the system will automatically display company home page 600 to the user after user log on, and the information displayed may be automatically updated at regular intervals. Various users may review company home page 600 including company users such as monitoring center staff and management.

Device status summary section 614 may present the user with the current condition of monitored devices aggregated into device groups. In the embodiment shown in FIG. 6, monitored devices may be grouped by device functional type, e.g. power distribution units (PDU's), environmental units, network cooling systems, uninterruptible power supplies (UPS's) or other devices. It should be appreciated that if a particular company has no monitored devices that fall within one of these categories then that category may be omitted from device status summary section 614. When one or more devices within a group encounter an anomaly, that group may be highlighted. In the FIG. 6 embodiment, this highlighting may take on the form of a red attention status icon. As illustrated in FIG. 6*a*, the user may then hover the mouse pointer over the status icon to gain additional information regarding the problem, such as the serial number, device name and device location of the device reporting the anomaly. Further drill-down functionality may allow the user to click on the serial number of the device to access the event log for that device, as depicted in FIG. 6*b*.

Company relationship status section 618 may present the user with the current condition of the company profile and agreement/contract status. As with device status summary section 614 above, hovering the mouse point over the status icon may enable the user to view more specific information regarding the source of any validation or agreement problems. In one embodiment, actuating the status icon for profile validation may cause the system to display validation screen 1400 depicted in FIG. 14 as discussed below. Actuating an anomalous status icon associated with agreement status may cause the system to display the user contract/agreement at issue.

Event and ticket history section 620 may contain a graphical representation of monitored device anomalous events and any resulting tickets within the previous time specified in date horizon user interface element 624. In the embodiment shown in FIG. 6, the graphical representation may be a line graph that presents the daily volume of tickets and events as a function of time. Date horizon user interface element 624 specifies that 7 days of historical data should be represented. In one embodiment, date horizon user interface element 624 may default to 14, 30, 90 or a customer configurable number of days. As shown by legend 628, events and tickets may be displayed as separate data ranges. In one embodiment, events and tickets may be combined into a single data range in a bar graph representation.

Event and ticket history section 2004 may contain a graphical representation of monitored device anomalous events and any resulting tickets within the previous year. In the embodiment shown in FIG. 20, the graphical representation may be a bar graph that presents the quarterly volume of tickets and events as a function of time. As shown by legend 2008, events and tickets may be displayed as separate data ranges. In one embodiment, events and tickets may be combined into a single data range in a line graph representation.

In another embodiment, white paper list 626 may provide navigation elements to white papers focused on APC equipment.

Navigation element 602 may invoke the Profile Wizard interface discussed above. Navigation element 604 may allow the user to view all of the monitored devices associated with the company. Navigation element 606 may expose a link to system reports. Navigation elements 608 and 610 may cause the system to display a contacts user interface and user help, respectively.

Figure 19:
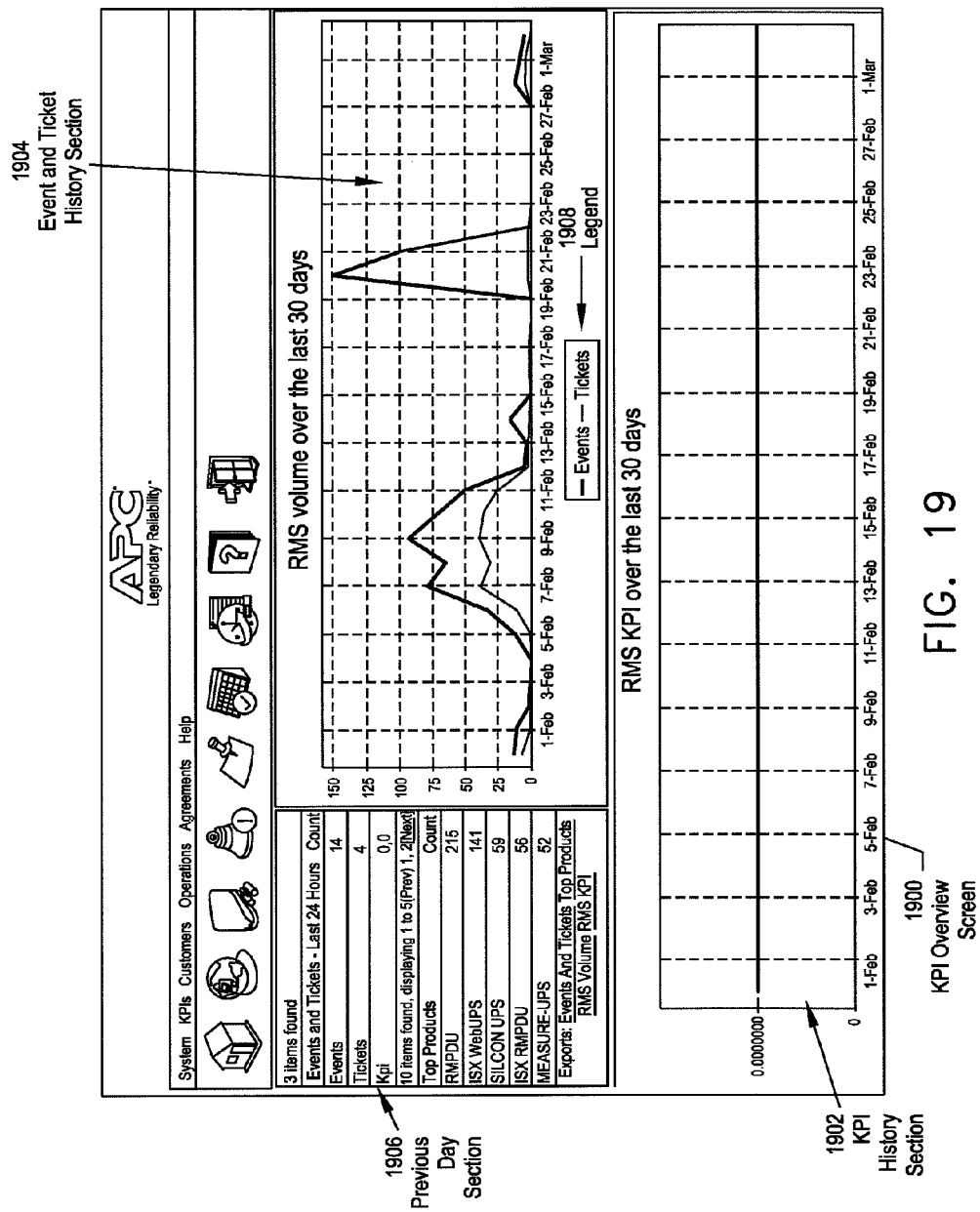
FIG. 19 is another example user interface according to one embodiment of the present invention that may be presented to a user by a remote device monitoring system to display KPI overview information.

FIGS. 19-22 illustrate an example interface that may enable users to view Key Performance Indictor (KPI) and related information. KPI's may include metrics such as the number of tickets that were not responded to within a target timeframe and the actual response time for those instances when the response time exceeded the target. More particularly, FIG. 19 depicts KPI overview screen 1900 which may include KPI history section 1902, event and ticket history section 1904 and previous day section 1906.

KPI history section 1902 may display a graphical representation of system KPI's for the previous 30 day period. In the embodiment shown in FIG. 19, the graphical representation may be a line graph that presents the number of times KPI's were not met per day as a function of time. In one embodiment, the graphical representation may be a bar graph.

Event and ticket history section 1904 may contain a graphical representation of monitored device anomalous events and any resulting tickets within the previous 30 days. In the embodiment shown in FIG. 19, the graphical representation may be a line graph that presents the daily volume of tickets and events as a function of time. As shown by legend 1908, events and tickets may be displayed as separate data ranges. In one embodiment, events and tickets may be combined into a single data range in a bar graph representation.

Previous day section 1906 may display a snapshot of metrics based on the previous 24 hour period. Information displayed in this section may include events and tickets as well as summaries of the devices that generated the most events and tickets in the previous 24 hours. Previous day section 1906 may also include user interface elements that enable the user to export the information presented on KPI overview screen 1900 to a third party application, such as Microsoft Excel.

Figure 20:
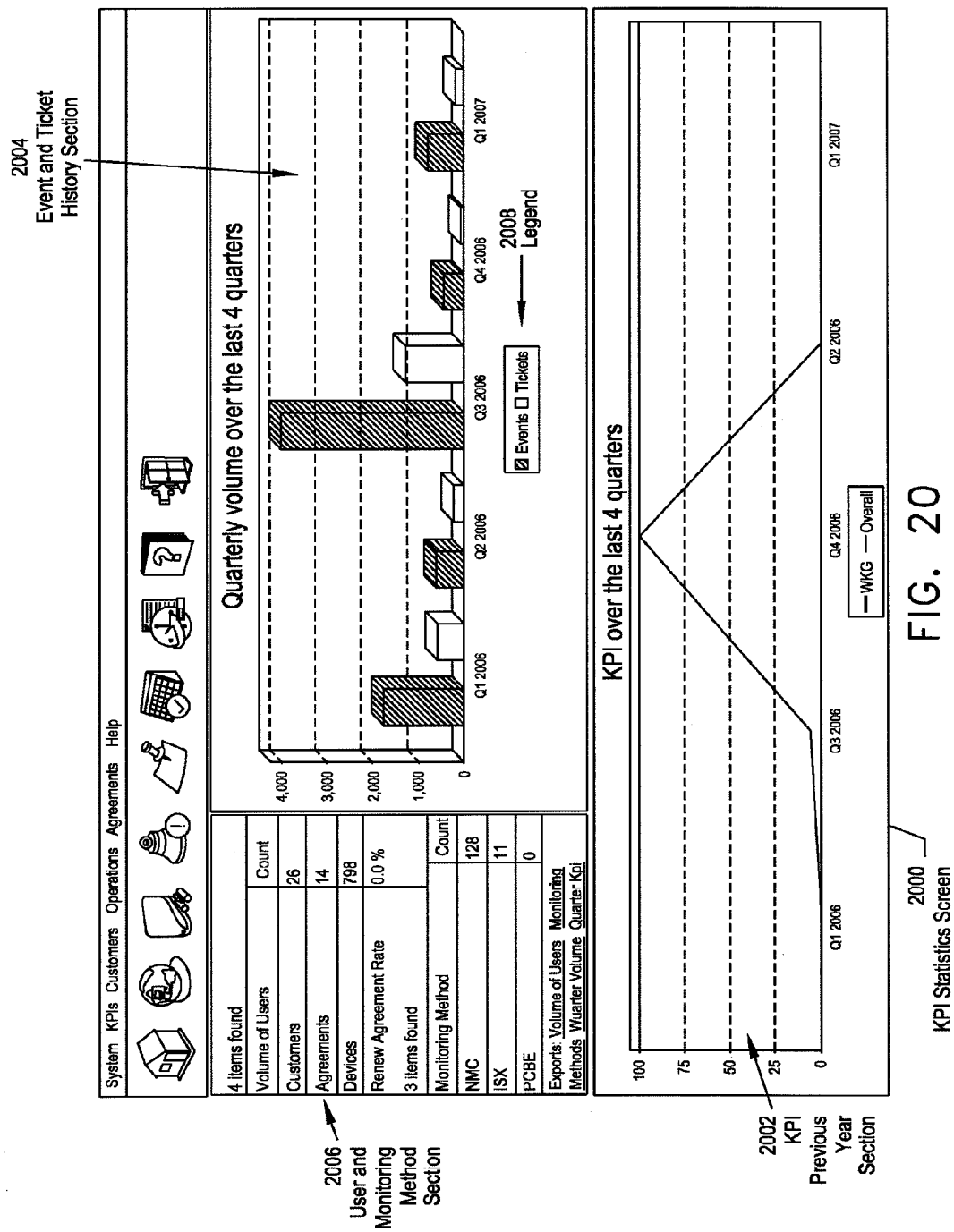
FIG. 20 is another example user interface according to one embodiment of the present invention that may be presented to a user by a remote device monitoring system to display KPI statistics information.

FIG. 20 may show KPI statistics screen 2000 which is similar to KPI Overview screen 1900, but generally utilizes more and older device data. KPI statistics screen 2000 may include KPI previous year section 2002, event and ticket history section 2004 and user and monitoring method section 2006.

KPI previous year section 2002 may display a graphical representation of system KPI's for the previous year. In the embodiment shown in FIG. 20, the graphical representation may be a line graph that presents the number of times KPI's were not met per quarter as a function of time. In one embodiment, the graphical representation may be a bar graph.

Event and ticket history section 2004 may contain a graphical representation of monitored device anomalous events and any resulting tickets within the previous year. In the embodiment shown in FIG. 20, the graphical representation may be a bar graph that presents the quarterly volume of tickets and events as a function of time. As shown by legend 2008, events and tickets may be displayed as separate data ranges. In one embodiment, events and tickets may be combined into a single data range in a line graph representation.

User and monitoring method section 2006 may display a snapshot of metrics based on the previous 30 days. Information displayed in this section may include metrics such as customer count, agreement/contract count, device count and agreement/contract renewal rate as well as the type and number of monitoring methods that are in use. User and monitoring method section 2006 may also include user interface elements that enable the user to export the information presented on KPI statistics screen 2000 to a third party application, such as Microsoft Excel.

Figure 21:
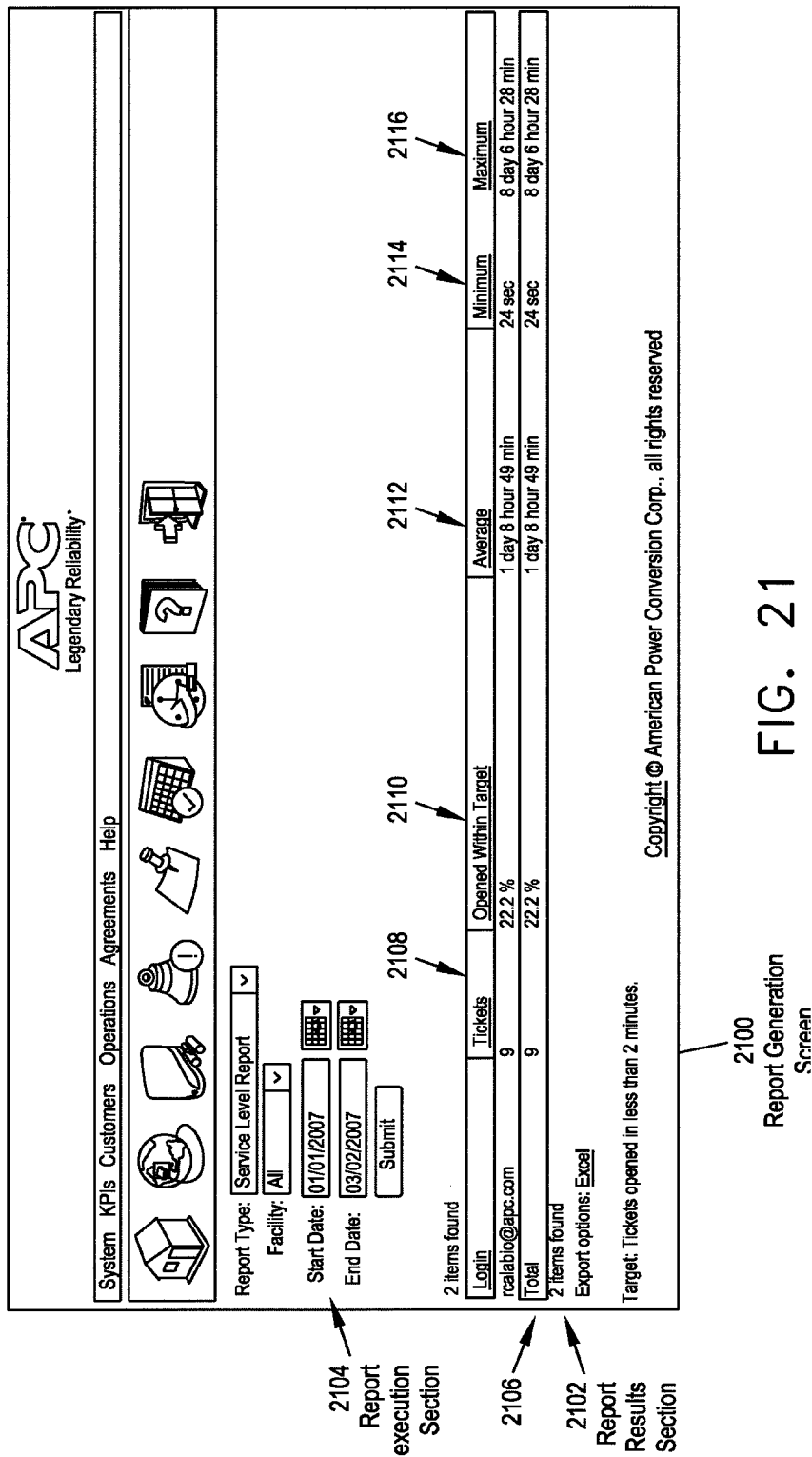
FIG. 21 is another example user interface according to one embodiment of the present invention that may be presented to a user by a remote device monitoring system to display service level information.
Figure 22:
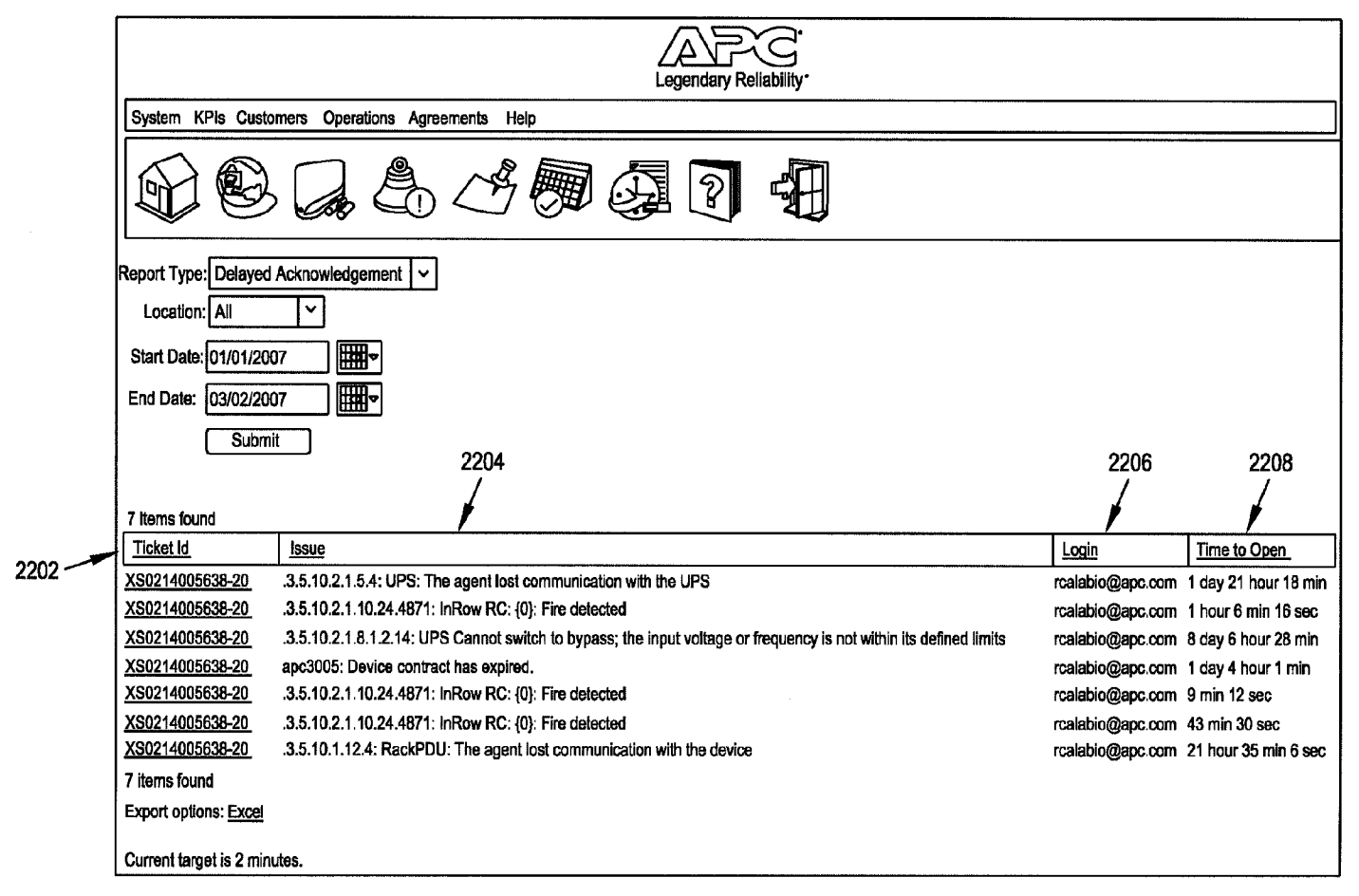

FIGS. 21 and 22 show an exemplary KPI report generation interface which may allow the user to execute and view KPI reports. FIG. 21 depicts a report generation screen 2100 which may include report execution section 2104 and report results section 2102. The user may execute a report by submitting the information required in report execution section

2104. This information may include the type of report desired, the start and end date and time of the data to include in the report and which facilities to include in the report. Once any required information is submitted the system may display the resulting report in report results section 2102.

As illustrated in FIG. 21, the information displayed by the service level report may include operator identifier 2106, number of tickets 2108, percentage of tickets opened within target response time 2110, average response time 2112, minimum response time 2114, and maximum response time 2116. As shown in FIG. 22, the information displayed by the delayed acknowledgement report may include ticket identifier 2202, issue description 2204, operator identifier 2206 and the response time 2208.

Figure 15:
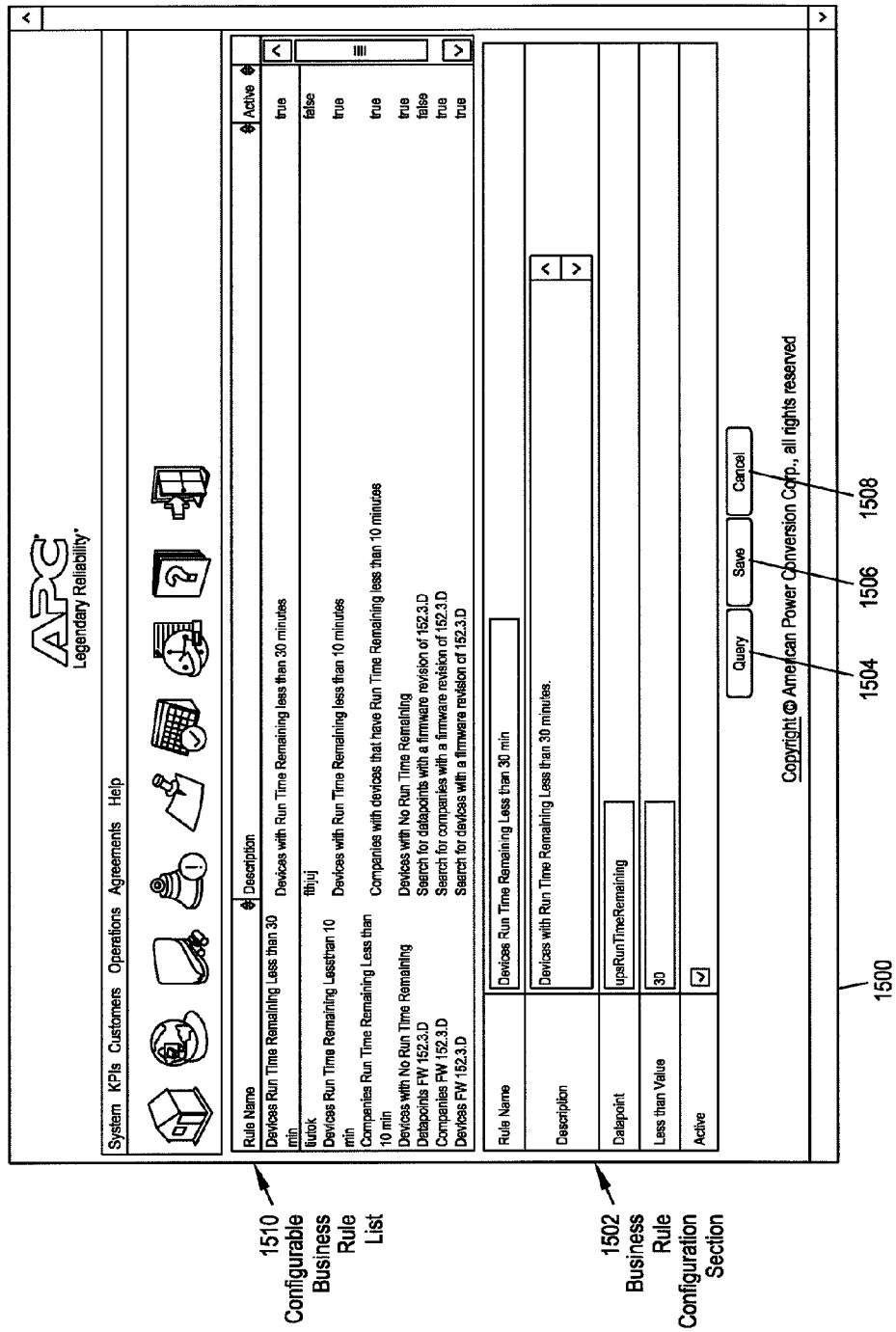
FIG. 15 is another example user interface according to one embodiment of the present invention that may be presented to a user by a remote device monitoring system to configure a business rule.
Figure 17:
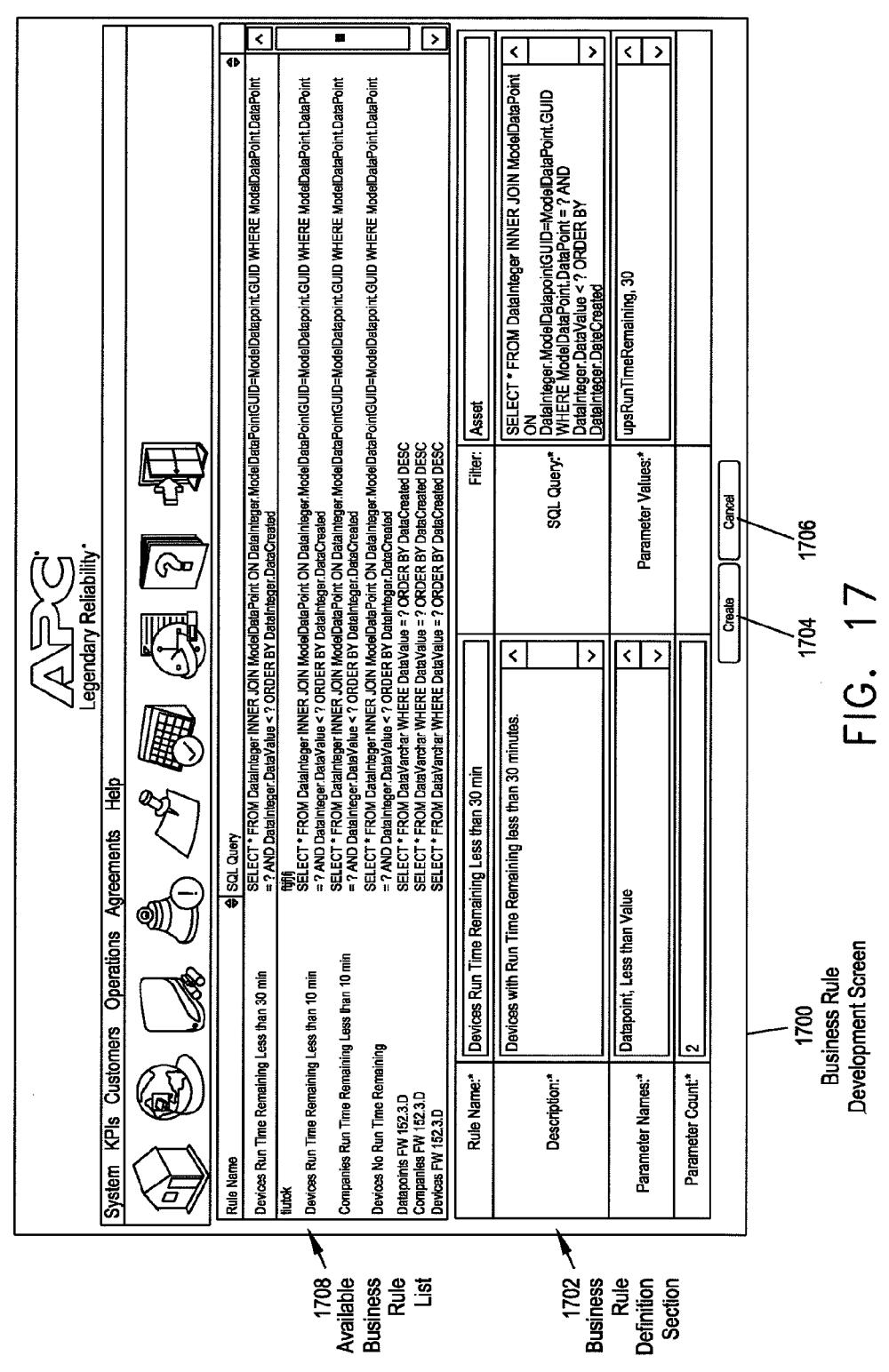

FIGS. 15-17 show an example user interface enabling development, configuration and execution of business rules. According to one embodiment, business rules enable various vocational groups, e.g. support, sales and product development, in a device manufacturing and monitoring company, such as the APC Corporation, to perform management functions related to devices installed in the field. For instance, such functions may include obtaining information about the installed device base, such as how the devices are performing in the field, determining which devices do not have the latest version of firmware and upgrading software on installed devices, among other data and/or functions. This information may be used to provide proactive support, understand device behavior in the field and identify potential upgrade opportunities. FIG. 17 illustrates business rule development screen 1700 which may include business rule definition section 1702, available business rule list 1708 and user interface elements 1704-1706.

Business rule definition section 1702 may give development personal the ability to create new business rules that can be later configured by end users, such as monitoring center staff. The information captured by business rule definition section 1702 may include rule name, description, parameter names, number of parameters, filter, SQL Query and parameter values. The user may create a new business rule by entering the required information in business rule definition section 1702 and actuating user interface element 1704. Similarly, the user may abort the creation of a new business rule by actuating user interface element 1706.

Available business rule list 1708 may list the business rules that have already been created. The user may modify a rule selected in list 1708 by changing the definition of the rule in section 1702 and actuating user interface element 1704.

FIG. 15 depicts business rule configuration screen 1500 which may include business rule parameters section 1502, configurable business rule list 1510 and user interface elements 1504-1508.

Business rule configuration section 1502 may allow users having certain user roles to configure business rules to be used by other system users. In one embodiment, any user with a user role of (NOC) super administrator may configure business rules. The information captured by business rule configuration section 1502 may include the rule name, description, parameter values and whether or not the business rule is active and thus available to other system users. The user may execute a newly configured business rule by selecting the desired business rule from configurable business rule list 1510, entering any information required by the business rule in section 1502 and actuating user interface element 1504. The user may save a configured business rule for later use by entering any information required by the business rule in section 1502 and actuating user interface element 1506. The user may exit business rule configuration screen 1500 without saving the currently configured business rule by actuating user interface element 1508.

Configurable business rule list 1510 may include all of the business rules made available for configuration by the system development staff.

FIG. 16 shows business rule results screen 1600 which may include business rule results section 1602, executable business rule list 1604 and user interface element 1606.

Executable business rule list 1604 may list all of active configured business rules and may allow the user to execute any of the listed business rules by selecting it. The results may then be displayed in business rule results section 1602. The user may export the results to a third party application, such as Microsoft Excel, by actuating user interface element 1606.

Figure 5:
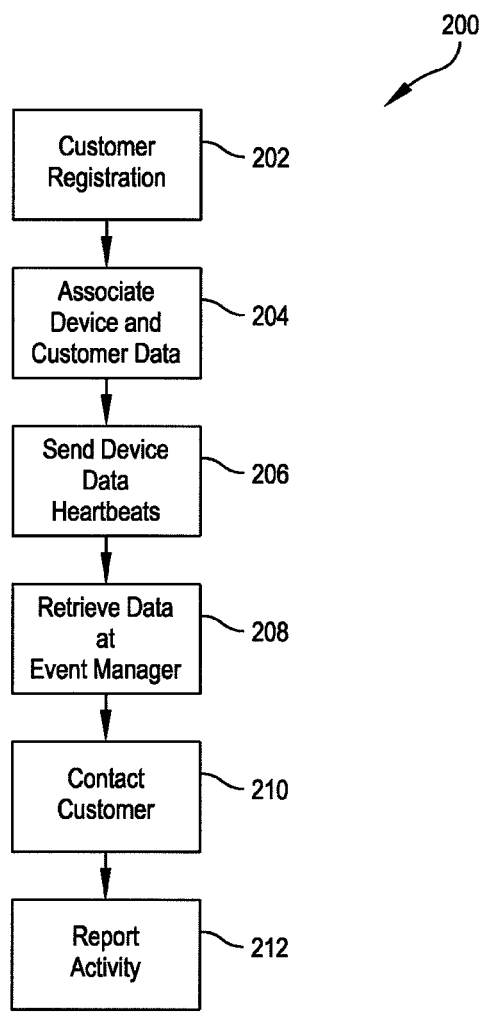
FIG. 5 is a block flow diagram of a process of monitoring power status information for a remote location.

In operation, referring to FIG. 5, with further reference to FIGS. 1-4, a process 200 for monitoring and reporting device status using the system 10 includes the stages shown. The process 200, however, is exemplary only and not limiting. The process 200 can be altered, e.g., by having stages added, removed, or rearranged.

At stage 202, a user registers by entering contact information at a web portal 26 or device user interface. The user can make a one-time entry of customer profile information. The user chooses to be a part of the remote monitoring service that monitors and reports status information of the devices 18 at the user site 12 by registering at the Remote Monitoring Service website 27. The website 27 can be operated by the remote monitoring center 16 or by a third party. The user enters information, such as name, location, address, time zone, and direct contact data. The customer data may also, or alternatively, be sent by XML or HTTP post. Device registration is accomplished automatically via the API 24.

At stage 204, a monitored device 18 is started up. At startup, device information is sent automatically from the monitored device 18 to the event manager 34. User data and device data are associated at the monitoring center 16, e.g., using a lookup table with device information (e.g., serial number) and corresponding customer data. Devices at the user's location are associated with the user via the registration data entered at the web portal 26. The device data can be XML formatted and can be sent to the server 32 via HTTP post.

At stage 206, the API 24 sends heartbeats and/or separate or included indicia of power events, environmental events, or failure events for the device 18. For example, a power problem/event/anomaly or a return of power occurs at the device 18 and the API 24 reports the anomaly. The API 24 reports information regarding the time of the anomaly and the location of the device 18. The monitoring center 16 associates the incoming HTTP post with the customer data and stores the associated data in the database 30. The information is parsed, e.g., by reading tags, and data are retrieved for storage.

At stage 208, detailed device information is retrieved. The data are stored in the database 30. A staff member at the remote monitoring center 16 can review and monitor the device data using the event manager 34. For example, a staff member can inspect power activity, power outages, event occurrence and other status information related to one or many of the devices at one or more customer sites 12. The staff has a hyperlink to the remote monitoring website, and device information is retrieved for use at the event manager 34. Device specifics may not be duplicated at the event manager 34 due to the hyperlink.

At stage 210, the staff member at the event manager 34 contacts the customer based on the device data retrieved. For example, if an event 71 has occurred, the event manager 34 displays the severity of the event 71 via a color-coded list of events 71. The event manager 34 can contact a customer where an event has taken place.

At stage 212, the report 120 is generated, e.g., periodically. The report 120 provides a snapshot of the device activity over a specified duration. The report 120 can cover a set duration, such as a one-month period of activity. Users access the report via the RMS website 27, at the web portal 26 or received the report via email or via postal service. Evaluation and analysis of the event activity is provided through the report 120.

The process 200 depicts a preferable sequence of events. Other stages can be added, or the order of stages can be altered in the process 200. For example, device data can be received prior to receiving customer registration data. In this instance, the device data are held in a limbo state at the server 32 until the accompanying customer data is received.

Figure 27:
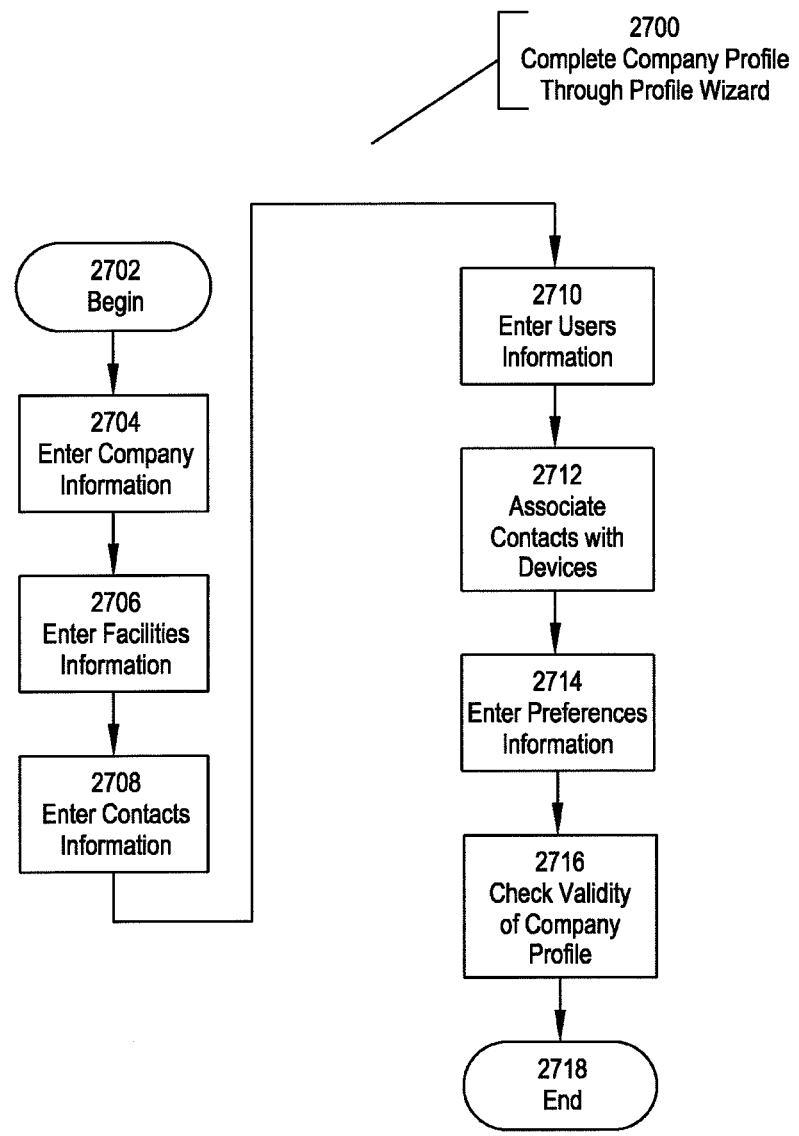
FIG. 27 is a flow chart of a method of completing a company profile according to one embodiment of the invention.

At least one aspect of the present invention relates to the user completing a company profile through the Profile Wizard. The high level procedural flow of this method is shown in FIG. 27, with further reference to FIGS. 1 and 7-14, and may consist primarily of the Profile Wizard prompting the user to enter company information 2704, enter facilities information 2706, enter contacts information 2708, enter users information 2710, associate contacts with devices 2712, enter preferences information 2714 and check the validity of the company profile 2716. Components of this process may be implemented using a general-purpose computer system as discussed with regard to FIG. 24 below and accessed through web portal 26.

At stage 2702, process 2700 begins. At stage 2704, the Profile Wizard may prompt the user to enter the information required by company screen 800. In one embodiment, this information may include company name, company phone, company contact first name, company contact last name and company contact phone number. After entering all of the required information, user may actuate common user interface element 728 to move the next Profile Wizard screen.

At stage 2706, the Profile Wizard may prompt the user to enter the information required by facilities screen 900. In one embodiment, this information may include facility name, address, country, city/municipality and time zone. After entering all of the required information, user may actuate common user interface element 728 to move the next Profile Wizard screen.

At stage 2708, the Profile Wizard may prompt the user to enter the information required by contacts screen 1000. In one embodiment, this information may include first name, last name, email address, facility and phone number. After entering all of the required information, user may actuate user common interface element 728 to move the next Profile Wizard screen.

At stage 2710, the Profile Wizard may prompt the user to enter the information required by users screen 1100. In one embodiment, this information may include name, login, password, confirm password and user role. After entering all of the required information, user may actuate common user interface element 728 to move the next Profile Wizard screen.

At stage 2712, the Profile Wizard may prompt the user to associate contacts with devices using devices screen 1200. In one embodiment, the user may associate contacts with devices in any manner described above with regard to devices screen 1200. After associating all devices with contacts, user may actuate common user interface element 728 to move the next Profile Wizard screen.

At stage 2714, the Profile Wizard may prompt the user to enter the information required for a contact to receive report 120 using preferences screen 1300. After entering all of the desired information, user may actuate common user interface element 728 to move the next Profile Wizard screen.

At stage 2716, the Profile Wizard may prompt the user to check the validity of the company profile using validation screen 1400. In one embodiment, the user may check the validity of the company profile by actuating user interface element 1404. The user may use any errors or warning reported by validation screen 1400 to make corrections to the company profile. Once no validation errors or warnings exist, stage 2718 is reached, and process 2700 ends.

The process 2700 depicts a preferable sequence of events. Other stages can be added, or the order of stages can be altered in the process 2700 without departing from the spirit of the present invention.

Other embodiments are within the scope and spirit of the appended claims. For example, due to the nature of software, functions described above can be implemented using software, hardware (e.g., an embedded web card), firmware, hardwiring, or combinations of any of these. Features implementing functions may also be physically located at various positions, including being distributed such that portions of functions are implemented at different physical locations. Additionally, power status information can be provided only when an event occurs, rather than at regular intervals.

Other embodiments of the MD 22 are possible. For example, the MD 22 may be located in or attached to (e.g., inserted into a receptacle of) the devices 18. Such devices would be configured to communicate with the network 14 and provide management information.

The above defined processes 200 and 2700, according to one embodiment of the invention, may be implemented on one or more general-purpose computer systems. For example, various aspects of the invention may be implemented as specialized software executing in a general-purpose computer system 400 such as that shown in FIG. 24. Computer system 400 may include one or more output devices 401, one or more input devices 402, a processor 403 connected to one or more memory devices 404 through an interconnection mechanism 405 and one or more storage devices 406 connected to interconnection mechanism 405. Output devices 401 typically render information for external presentation and examples include a monitor and a printer. Input devices 402 typically accept information from external sources and examples include a keyboard and a mouse. Processor 403 typically performs a series of instructions resulting in data manipulation. Processor 403 is typically a commercially available processor such as an Intel Pentium, Motorola PowerPC, SGI MIPS, Sun UltraSPARC, or Hewlett-Packard PA-RISC processor, but may be any type of processor. Memory devices 404, such as a disk drive, memory, or other device for storing data is typically used for storing programs and data during operation of the computer system 400. Devices in computer system 400 may be coupled by at least one interconnection mechanism 405, which may include, for example, one or more communication elements (e.g., busses) that communicate data within system 400.

Figure 25:
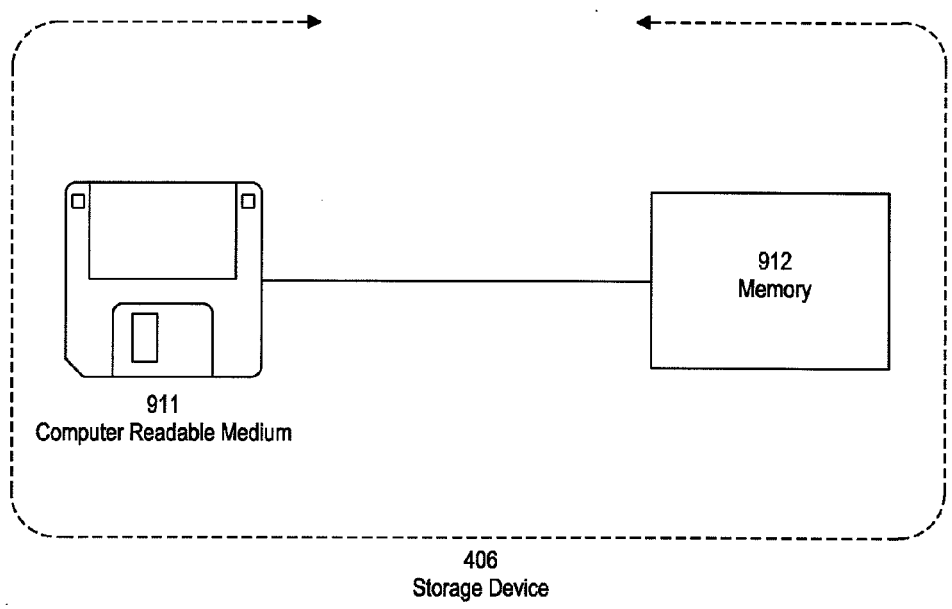
FIG. 25 illustrates a storage device of a general-purpose computer system.

The storage device 406, shown in greater detail in FIG. 25, typically includes a computer readable and writeable nonvolatile recording medium 911 in which signals are stored that define a program to be executed by the processor or information stored on or in the medium 911 to be processed by the program. The medium may, for example, be a disk or flash memory. Typically, in operation, the processor causes data to be read from the nonvolatile recording medium 911 into another memory 912 that allows for faster access to the information by the processor than does the medium 911. This memory 912 is typically a volatile, random access memory such as a dynamic random access memory (DRAM), static memory (SRAM) or flash memory. It may be located in storage device 406, as shown, or in memory device 404. The processor 403 generally manipulates the data within the memory 404, 912 and then copies the data to the medium 911 after processing is completed. A variety of mechanisms are known for managing data movement between the medium 911 and the memory 404, 912, and the invention is not limited thereto. The invention is not limited to a particular memory device 404 or storage device 406.

Computer system 400 may be implemented using specially programmed, special purpose hardware, or may be a general-purpose computer system that is programmable using a high-level computer programming language. For example, computer system 400 may include cellular phones and personal digital assistants. Computer system 400 usually executes an operating system which may be, for example, the Windows 95, Windows 98, Windows NT, Windows 2000, Windows ME, Windows XP, Windows Vista or other operating systems available from the Microsoft Corporation, MAC OS System X available from Apple Computer, the Solaris Operating System available from Sun Microsystems, or UNIX operating systems available from various sources (e.g., Linux). Many other operating systems may be used, and the invention is not limited to any particular implementation. For example, an embodiment of the present invention may instruct network devices to change power consumption a general-purpose computer system with a Sun UltraSPARC processor running the Solaris operating system.

Figure 24:
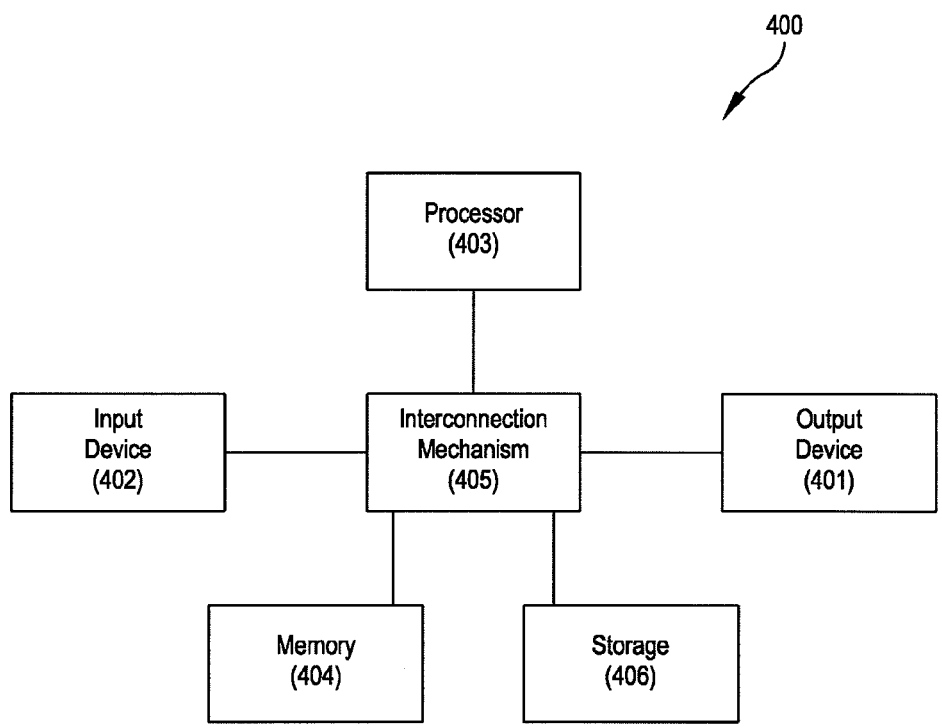
FIG. 24 shows a general-purpose computer system upon which various embodiments of the invention may be practiced.

Although computer system 400 is shown by way of example as one type of computer system upon which various aspects of the invention may be practiced, it should be appreciated that the invention is not limited to being implemented on the computer system as shown in FIG. 24. Various aspects of the invention may be practiced on one or more computers having a different architecture or components than that shown in FIG. 24. To illustrate, one embodiment of the present invention may retrieve detailed device information using several general-purpose computer systems running MAC OS System X with Motorola PowerPC processors and several specialized computer systems running proprietary hardware and operating systems.

Figure 26:
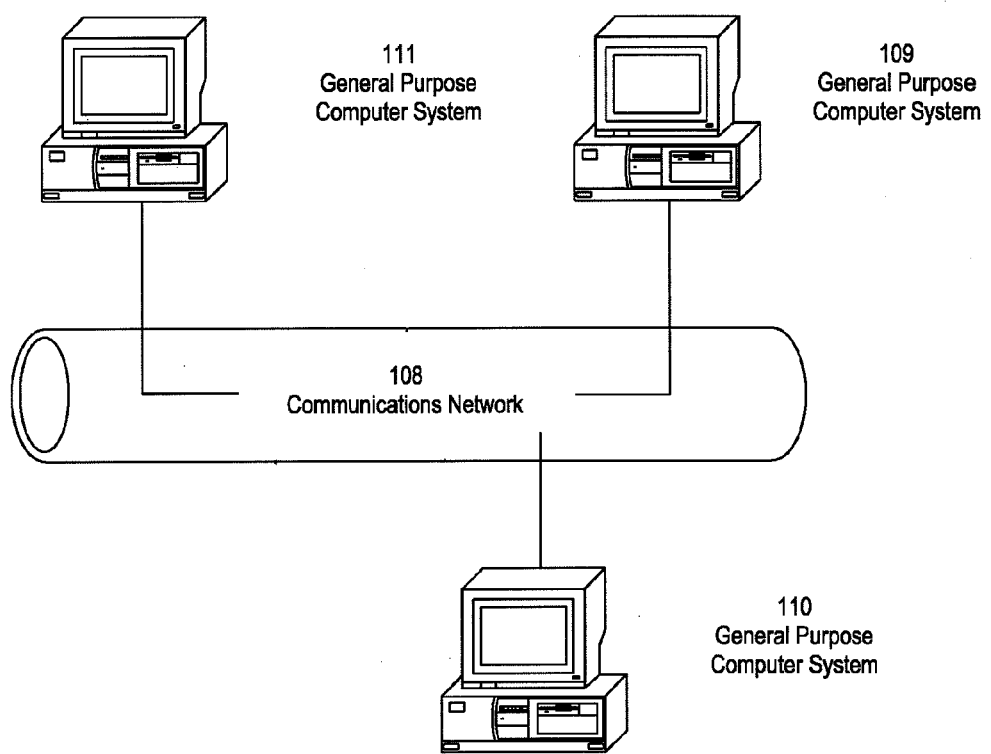
FIG. 26 depicts a network of general-purpose computer systems.

As depicted in FIG. 26, one or more portions of the system may be distributed to one or more computers (e.g., systems 109-111) coupled to communications network 108. These computer systems 109-111 may also be general-purpose computer systems. For example, various aspects of the invention may be distributed among one or more computer systems configured to provide a service (e.g., servers) to one or more client computers, or to perform an overall task as part of a distributed system. More particularly, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). To illustrate, one embodiment may display validation screen 1400 though a browser interpreting HTML forms and may retrieve detailed device information using a data translation service running on a separate server.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. For example, preferences screen 1300 may be implemented using a Microsoft Word document while the application designed to send device data heartbeats may be written in C++.

It should be appreciated that a general-purpose computer system in accord with the present invention may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of UPPSALA, Sweden and WebSphere middleware from IBM of Armonk, N.Y. If SQL Server is installed on a general-purpose computer system to implement an embodiment of the present invention, the same general-purpose computer system may be able to support databases for sundry applications.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method of remotely monitoring an uninterruptible power supply (UPS), the method comprising:

detecting, by a management device implemented in hardware and included within the UPS, an operational condition of the UPS;

generating, by the management device, status update information using a self-describing computer language, the status update information describing the operational condition of the UPS and including at least one of a load percentage, a temperature, and a humidity;

sending, by the management device, the status update information to a first remote computer via a communication network;

receiving, by the management device, at least one command for the UPS via the communication network, the at least one command being configured to change at least one characteristic of the UPS; and changing the at least one characteristic of the UPS based on the at least one command and configuration information associated with the UPS.

2. The method according to claim 1, further comprising:

receiving, by a second remote computer, registration information descriptive of an owner of the UPS and identifying the UPS;

generating, by the second remote computer, registration update information using the registration information, the registration update information being formatted in the self-describing computer language; and sending, by the second remote computer, the registration update information to the first remote computer via the communication network.

3. The method according to claim 2, further comprising:
receiving, by the first remote computer, the status update information;
receiving, by the first remote computer, the registration update information; and
associating, by the first remote computer, the status update information with the owner described in the registration information.

4. The method according to claim 3, wherein associating the status update information with the owner includes associating the UPS with the owner.

5. The method according to claim 4, wherein sending the status update information includes sending the status update information via an HTTP post and sending the registration update information includes sending the registration update information via an HTTP post.

6. The method according to claim 5, wherein generating the status update information includes formatting the status update information in eXtensible Markup Language (XML) and generating the registration update information includes formatting the registration update information in XML.

7. The method according to claim 6, further comprising:
identifying an upgrade plan for the UPS; and
presenting the upgrade plan to a user associated with the owner.

8. A non-transitory computer readable medium storing sequences of instruction to remotely monitor an uninterruptible power supply (UPS), the sequences of instruction including a first sequence of instructions that instruct at least one processor to:
detect an operational condition of the UPS;
generate status update information using a self-describing computer language, the status update information describing the operational condition of the UPS and including at least one of a load percentage, a temperature, and a humidity;
send the status update information to a first remote computer via a communication network
receive at least one command for the UPS via the communication network, the at least one command being configured to change at least one characteristic of the UPS; and
transmit one or more commands to the UPS, the one or more commands being based on the at least one command and configuration information associated with the UPS.

9. The computer readable medium according to claim 8, wherein the sequences of instruction include a second sequence of instructions that instruct at least one processor to:
receive registration information descriptive of an owner of the UPS and identifying the UPS;
generate registration update information using the registration information, the registration update information being formatted in the self-describing computer language; and
send the registration update information to the first remote computer via the communication network.

10. The computer readable medium according to claim 9, wherein the sequences of instruction include a third sequence of instructions that instruct at least one processor to:
receive the status update information;
receive the registration update information; and
associate the status update information with the owner described in the registration information.

11. The computer readable medium according to claim 10, wherein the third sequence of instructions associates the status update information with the owner by associating the UPS with the owner.

12. The computer readable medium according to claim 11, wherein the first sequence of instructions sends the status update information via an HTTP post and the second sequence of instructions sends the registration update information via an HTTP post.

13. The computer readable medium according to claim 12, wherein the first sequence of instructions formats the status update information in eXtensible Markup Language (XML) and the second sequence of instructions formats the registration update information in XML.

14. A remote monitoring hardware system comprising:
an uninterruptible power supply (UPS) including:
a first communication interface configured to communicate with a management device; and
at least one management device coupled to the first communications interface, the at least one management device including:
a second communications interface configured to communicate with a communications network; and
at least one hardware processor coupled to the communications network via the second communications interface, the at least one hardware processor being configured to:
detect an operational condition of the UPS via the first communications interface, the operational condition including at least one of a load percentage, a temperature, and a humidity;
generate status update information using a self-describing computer language, the status update information describing the operational condition of the UPS;
send the status update information to a first remote computer via the communication network;
receive at least one command for the UPS via the second communications interface, the at least one command being configured to change at least one characteristic of the UPS; and
transmit one or more commands to the UPS via the first communications interface, the one or more commands being based on the at least one command and configuration information associated with the UPS.

15. The remote monitoring system according to claim 14, further comprising a second remote computer configured to:
receive registration information descriptive of an owner of the UPS and identifying the UPS;
generate registration update information using the registration information, the registration update information being formatted in the self-describing computer language; and
send the registration update information to the first remote computer via the communication network.

16. The remote monitoring system according to claim 15, further comprising the first remote computer, the first remote computer being configured to:
receive the status update information;
receive the registration update information; and
associate the status update information with the owner described in the registration information.

17. The remote monitoring system according to claim 16, wherein the first remote computer is configured to associate the status update information with the owner by associating the UPS with the owner.

18. The remote monitoring system according to claim 17, wherein the at least one processor is configured to send the status update information via an HTTP post and the second remote computer is configured to send the registration update information via an HTTP post.

19. The remote monitoring system according to claim 18, wherein the self-describing computer language includes eXtensible Markup Language (XML).

20. The remote monitoring system according to claim 19, wherein the first remote computer includes a promotions module configured to:
    identify an upgrade plan for the UPS; and
    present the upgrade plan to a user associated with the owner.

* * * * *